(12) United States Patent
Hirata

(10) Patent No.: US 10,606,796 B2
(45) Date of Patent: Mar. 31, 2020

(54) ON-BOARD NETWORK SYSTEM, COMMUNICATION CONTROL METHOD IN THE ON-BOARD NETWORK SYSTEM, AND ON-BOARD GATEWAY

(71) Applicant: TOYOTA JIDOSHA KABUSHIKI KAISHA, Toyota-shi, Aichi-ken (JP)

(72) Inventor: Yoshiro Hirata, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 199 days.

(21) Appl. No.: 15/790,416

(22) Filed: Oct. 23, 2017

(65) Prior Publication Data

US 2018/0113836 A1 Apr. 26, 2018

(30) Foreign Application Priority Data

Oct. 25, 2016 (JP) .................... 2016-208978

(51) Int. Cl.
| | |
|---|---|
| G06F 15/173 | (2006.01) |
| H04L 12/825 | (2013.01) |
| H04L 12/801 | (2013.01) |
| H04L 29/08 | (2006.01) |
| H04L 29/14 | (2006.01) |
| H04B 17/18 | (2015.01) |

(Continued)

(52) U.S. Cl.
CPC ....... *G06F 15/17312* (2013.01); *H04B 17/18* (2015.01); *H04L 12/66* (2013.01); *H04L 47/13* (2013.01); *H04L 47/263* (2013.01); *H04L 67/12* (2013.01); *H04L 69/40* (2013.01); *H04W 88/16* (2013.01)

(58) Field of Classification Search
None
See application file for complete search history.

(56) References Cited

U.S. PATENT DOCUMENTS 5,987,022 A * 11/1999 Geiger .................... H04L 12/66
370/349
6,490,251 B2 * 12/2002 Yin ...................... H04L 12/5602
370/236.1

(Continued)

FOREIGN PATENT DOCUMENTS

JP 2013-538025 A 10/2013

*Primary Examiner* — Scott B Christensen
(74) *Attorney, Agent, or Firm* — Hunton Andrews Kurth LLP

(57) ABSTRACT

An on-board network system includes a plurality of controllers connected to a bus, a detecting unit that detects an error that occurs, a measuring unit that measures a degree of error occurrence detected by the detecting unit, and a communication controller that reduces a communication speed and a communication data amount of at least one of the controllers from a first speed and a first data amount to a second speed and a second data amount, when the error occurrence degree becomes equal to or larger than a first degree. The communication controller reduces the communication speed and the communication data amount, such that a first communication time it takes for data to be transmitted at the first speed in the first data amount is longer than a second communication time it takes for data to be transmitted at the second speed in the second data amount.

16 Claims, 10 Drawing Sheets

(51) Int. Cl.
    *H04L 12/66*    (2006.01)
    *H04W 88/16*    (2009.01)

(56) References Cited

U.S. PATENT DOCUMENTS

| | | | |
|---|---|---|---|
| 7,142,534 B1 * | 11/2006 | Whent | H04L 29/06027 370/352 |
| 7,633,869 B1 * | 12/2009 | Morris | H04L 41/0896 370/232 |
| 2007/0223459 A1 * | 9/2007 | Crowle | H04J 3/0664 370/353 |
| 2008/0225715 A1 * | 9/2008 | Plamondon | H04L 1/0025 370/232 |
| 2010/0039937 A1 * | 2/2010 | Ramanujan | H04L 47/10 370/232 |
| 2013/0290580 A1 | 10/2013 | Hartwich et al. | |

* cited by examiner

ON-BOARD NETWORK SYSTEM, COMMUNICATION CONTROL METHOD IN THE ON-BOARD NETWORK SYSTEM, AND ON-BOARD GATEWAY

INCORPORATION BY REFERENCE

The disclosure of Japanese Patent Application No. 2016-208978 filed on Oct. 25, 2016 including the specification, drawings and abstract is incorporated herein by reference in its entirety.

BACKGROUND

1. Technical Field

The disclosure relates to an on-board network system, a communication control method of controlling communications in the on-board network system, and an on-board gateway.

2. Description of Related Art

In connection with a CAN (Controller Area Network) network including a plurality of ECUs (Electronic Control Units) connected to a bus, a data transmission method is known in which the communication speed is reduced after an error is detected (see, for example, Japanese Patent Application Publication No. 2013-538025 (JP 2013-538025 A)).

SUMMARY

In the above method, the communication speed is merely reduced when an error is detected; therefore, when the communication speed is reduced, a length of time for which data occupies the bus is increased to be longer than that before the communication speed is reduced, and there is a possibility of occurrence of a communication failure, such as a collision with other data, or a delay in transmission of other data, for example.

This disclosure provides an on-board network system that is less likely or unlikely to suffer from a communication failure or a delay in data transmission, a method of controlling communications in the on-board network system, and an on-board gateway.

An on-board network system according to a first aspect of the disclosure includes a first bus, a plurality of first controllers connected to the first bus, an error detecting unit that detects an error that occurs in the first bus, a degree-of-occurrence measuring unit that measures a degree of error occurrence detected by the error detecting unit, and a communication controller configured to reduce a communication speed and a communication data amount of at least one of the plurality of first controllers from a first communication speed and a first communication data amount to a second communication speed and a second communication data amount, when the degree of error occurrence becomes equal to or larger than a first degree. The communication controller is configured to reduce the communication speed and the communication data amount of the above-indicated at least one of the first controllers, such that a first communication time it takes for data to be transmitted at the first communication speed in the first communication data amount is larger than a second communication time it takes for data to be transmitted at the second communication speed in the second communication data amount.

Thus, the communication time of data after the communication speed and the communication data amount are reduced is made equal to or shorter than the communication time of data before the communication speed and the communication data amount are reduced, so that data after reduction of the communication speed and data amount can be fitted in a frame of communication time of data before the reduction. In other words, the first communication time of data before the communication speed and the communication data amount are reduced is made longer than the second communication time of data after the communication speed and the communication data amount are reduced, so that data after reduction of the communication speed and data amount can be fitted in a frame of the first communication time of data before the reduction.

Accordingly, even if the communication speed and the communication data amount are reduced, it is possible to curb occurrence of a communication failure or a delay in data communication.

In the on-board network system as described above, the communication controller may reduce the communication data amount to the second communication data amount, by dividing data of the first communication data amount, into a predetermined number of data.

Thus, if the data having the first communication data amount is divided into the predetermined number of data, the communication data amount can be easily reduced, and the data obtained by reducing the communication data amount can be easily managed.

Accordingly, the on-board network system in which the communication data amount can be easily reduced, and the data can be easily managed, can be provided.

In the on-board network system as described above, the communication controller may transmit first data at the second communication speed in the second communication data amount, to the above-indicated at least one of the first controllers, and the first controller that has received the first data may output second data to the first bus at the second communication speed in the second communication data amount.

Thus, if the first controller receives the first data transmitted at the second communication speed in the second communication data amount, from the communication controller, the first controller outputs the second data at the second communication speed in the second communication data amount. Therefore, there is no need to provide dedicated signals or information, so as to reduce the communication speed and the communication data amount.

Accordingly, it is possible to curb occurrence of a communication failure and a delay in data transmission, without increasing the amount of data transmitted via the first bus.

In the on-board network system as described above, the degree-of-occurrence measuring unit may reduce the degree of error occurrence in the first bus, according to a degree by which the error is not detected in the first bus by the error detecting unit. The communication controller may return the communication speed and the communication data amount of the first controller of which the communication speed and communication data amount have been reduced to the second communication speed and the second communication data amount, to the first communication speed and the first communication data amount, when the degree of error occurrence in the first bus becomes equal to zero.

Thus, when the degree of error occurrence becomes equal to zero, the communication speed and the communication data amount are reduced to the first communication speed and the first communication data amount before the reduction thereof. Therefore, even if the communication speed and the communication data amount are returned to the higher communication speed and the larger communication data volume, the system is in a condition where a communication failure or a delay in data transmission is far less likely or unlikely to occur.

Accordingly, it is possible to provide the on-board network system in which communications can be performed again at the higher communication speed, in the larger communication data volume, after the degree of error occurrence becomes equal to zero.

In the on-board network system as described above, the communication controller may transmit third data at the first communication speed in the first communication data amount, to the first controller of which the communication speed and the communication data amount have been reduced to the second communication speed and the second communication data amount, and the first controller that has received the third data may output fourth data to the first bus at the first communication speed in the first communication data amount.

Thus, if the first controller receives the third data transmitted at the first communication speed in the first communication data amount, from the communication controller, it returns the communication speed and the communication data amount to the first communication speed and the first communication data amount, and outputs the fourth data at the first communication speed in the first communication data amount. Therefore, there is no need to provide dedicated signals or information, so as to return the communication speed and the communication data amount to the first communication speed and the first communication data amount.

Accordingly, even when the communication speed and the communication data amount are returned to the first communication speed and the first communication data amount, it is possible to curb occurrence of a communication failure or a delay in data transmission, without increasing the amount of data transmitted via the first bus.

The on-board network system as described above may further include a second controller connected to the first bus. When the degree of error occurrence in the first bus becomes equal to or larger than a second degree that is larger than the first degree, the communication controller may reduce the communication speed and the communication data amount of the second controller, from the first communication speed and the first communication data amount to the second communication speed and the second communication data amount, such that the first communication time is longer than the second communication time.

Thus, the second controller reduces the communication speed and the communication data amount, when the degree of error occurrence becomes equal to or larger than the second degree that is larger than the first degree. Thus, it is possible to classify two or more controllers into two or more groups, and change a condition under which the communication speed and the communication data amount are reduced, for each group.

Accordingly, it is possible to provide the on-board network system that can reduce the communication speed and the communication data amount for each group, according to the type, usage, etc. of the first controller and the second controller, while curbing occurrence of a communication failure or a delay in data transmission.

In the on-board network system as described above, when the degree of error occurrence in the first bus becomes equal to or larger than the second degree, the communication controller may transmit fifth data to the second controller at the second communication speed in the second communication data amount, and the second controller that has received the fifth data may output sixth data to the first bus at the second communication speed in the second communication data amount.

Thus, if the second controller receives the fifth data transmitted at the second communication speed in the second communication data amount, from the communication controller, it outputs the sixth data at the second communication speed in the second communication data amount. Therefore, there is no need to provide dedicated signals or information, so as to reduce the communication speed and the communication data amount.

Accordingly, it is possible to curb occurrence of a communication failure or a delay in data transmission, without increasing the amount of data transmitted via the first bus.

In the on-board network system as described above, the degree-of-occurrence measuring unit may reduce the degree of error occurrence in the first bus, according to a degree by which the error is not detected in the first bus by the error detecting unit, and the communication controller may return the communication speed and the communication data amount of the second controller from the second communication speed and the second communication data amount to the first communication speed and the first communication data amount, when the degree of error occurrence in the first bus becomes equal to zero.

Thus, the communication controller returns the communication speed and the communication data amount to the first communication speed and the first communication data amount before the reduction thereof, when the degree of error occurrence becomes equal to zero. Therefore, the system is placed in a condition where a communication failure and a delay in data transmission are far less likely or unlikely to occur, even if the communication speed and the communication data amount are returned to the higher communication speed and the lager communication data volume.

Accordingly, it is possible to provide the on-board network system that can perform communications at the higher communication speed in the larger communication data volume again, after the degree of error occurrence becomes equal to zero.

In the on-board network system as described above, when the degree of error occurrence in the first bus becomes equal to zero, the communication controller may transmit seventh data to the second controller at the first communication speed in the first communication data amount, and the second controller that has received the seventh data may output eighth data to the first bus at the first communication speed in the first communication data amount.

Thus, when the second controller receives the seventh data transmitted at the first communication speed in the first communication data amount, from the communication controller, the second controller returns the communication speed and the communication data amount to the first communication speed and the first communication data amount, and outputs the eighth data at the first communication speed in the first communication data amount. Therefore, there is no need to provide dedicated signals or information, so as to return the communication speed and the communication data amount to the first communication speed and the first communication data amount.

Accordingly, when the communication speed and the communication data amount are returned to the first communication speed and the first communication data amount, it is possible to curb occurrence of a communication failure and a delay in data transmission, without increasing the amount of data transmitted via the first bus.

The on-board network system as described above may further include a second bus, and a second controller connected to the second bus. In this system, when the degree of error occurrence in the second bus becomes equal to or larger than a second degree that is larger than the first degree, the communication controller may reduce the communication speed and the communication data amount of the second controller from the first communication speed and the first communication data amount to the second communication speed and the second communication data amount, such that the first communication time is longer than the second communication time.

Thus, with regard to the second controller, the communication speed and the communication data amount are reduced, when the degree of error occurrence becomes equal to or larger than the second degree that is larger than the first degree. It is thus possible to classify the plurality of controllers into two or more groups, and change a condition under which the communication speed and the communication data amount are reduced, for each group.

Accordingly, it is possible to provide the on-board network system that can reduce the communication speed and the communication data amount for each group, according to the type, usage, etc. of the first controller and the second controller, while curbing occurrence of a communication failure and a delay in data communication.

In the on-board network system as described above, when the degree of error occurrence in the second bus becomes equal to or larger than the second degree, the communication controller may transmit fifth data to the second controller at the second communication speed in the second communication data amount, and the second controller that has received the fifth data may output sixth data to the second bus at the second communication speed in the second communication data amount.

Thus, when the second controller receives the fifth data transmitted at the second communication speed in the second communication data amount, from the communication controller, it outputs the sixth data at the second communication speed in the second communication data amount. Therefore, there is no need to provide dedicated signals or information, so as to reduce the communication speed and the communication data amount.

Accordingly, it is possible to curb occurrence of a communication failure and a delay in data transmission, without increasing the amount of data transmitted via the second bus.

In the on-board network system as described above, the degree-of-occurrence measuring unit may reduce the degree of error occurrence in the second bus, according to a degree by which the error is not detected in the second bus by the error detecting unit. When the degree of error occurrence in the second bus becomes equal to zero, the communication controller may return the communication speed and the communication data amount of the second controller from the second communication speed and the second communication data amount to the first communication speed and the first communication data amount.

Thus, when the degree of error occurrence becomes equal to zero, the communication speed and the communication data amount are returned to the first communication speed and the first communication data amount before the reduction thereof. Therefore, even if the communication speed and data amount are returned to the higher communication speed and the larger communication data volume, a communication failure and a delay in data transmission are far less likely or unlikely to occur.

Accordingly, the on-board network system that can perform communications again at the higher communication speed in the larger communication data volume, after the degree of error occurrence becomes equal to zero, can be provided.

In the on-board network system as described above, when the degree of error occurrence in the second bus becomes equal to zero, the communication controller may transmit seventh data to the second controller at the first communication speed in the first communication data amount, and the second controller that has received the seventh data may output eighth data to the second bus at the first communication speed in the first communication data amount.

Thus, when the second controller receives the seventh data transmitted at the first communication speed in the first communication data amount, from the communication controller, the communication speed and the communication data amount are returned to the first communication speed and the first communication data amount, and the second controller outputs the eighth data at the first communication speed in the first communication data amount. Therefore, there is no need to provide dedicated signals or information, so as to return the communication speed and data amount to the first communication speed and the first communication data amount.

Accordingly, it is possible to curb occurrence of a communication failure and a delay in data transmission, without increasing the amount of data transmitted via the second bus, even when the communication speed and the communication data amount are returned to the first communication speed and the first communication data amount.

A second aspect of the disclosure is concerned with a communication control method of controlling communications in an on-board network system including a bus, and a plurality of first controllers connected to the bus. The communication control method includes the steps of detecting an error that occurs in the bus, measuring a degree of error occurrence detected, and reducing a communication speed and a communication data amount of at least one of the plurality of first controllers, from a first communication speed and a first communication data amount to a second communication speed and a second communication data amount, when the degree of error occurrence becomes equal to or larger than a first degree, such that a first communication time it takes for data to be transmitted at the first communication speed in the first communication data amount is longer than a second communication time it takes for data to be transmitted at the second communication speed in the second communication data amount.

An on-board gateway according to a third aspect of the disclosure includes a controller configured to detect an error concerning communications with a plurality of first controllers connected to a first bus, measure a degree of occurrence of the error, and reduce a communication speed and a communication data amount of at least one of the plurality of first controllers, from a first communication speed and a first communication data amount to a second communication speed and a second communication data amount, when the degree of error occurrence becomes equal to or larger than a first degree, wherein a first communication time it takes for data to be transmitted at the first communication speed in the first communication data amount is longer than a second communication time it takes for data to be transmitted at the second communication speed in the second communication data amount.

Thus, the communication time of data after the communication speed and the communication data amount are reduced is made equal to or shorter than the communication time of data before the communication speed and the communication data amount are reduced, so that data after reduction of the communication speed and data amount can be fitted in a frame of communication time of data before the reduction. In other words, the first communication time of data before the communication speed and the communication data amount are reduced is made longer than the second communication time of data after the communication speed and the communication data amount are reduced, so that data after reduction of the communication speed and data amount can be fitted in a frame of the first communication time of data before the reduction.

Accordingly, it is possible to curb occurrence of a communication failure and a delay in data transmission, even if the communication speed and the communication data amount are reduced.

It is thus possible to provide the on-board network system that is less likely or unlikely to suffer from a communication failure and a delay in data transmission, and the communication control method of controlling communications in the on-board network system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

In the following, one embodiment of the disclosure in the form of an on-board network system, and a communication control method of controlling communications in the on-board network system, will be described.

Embodiment

Figure 1:
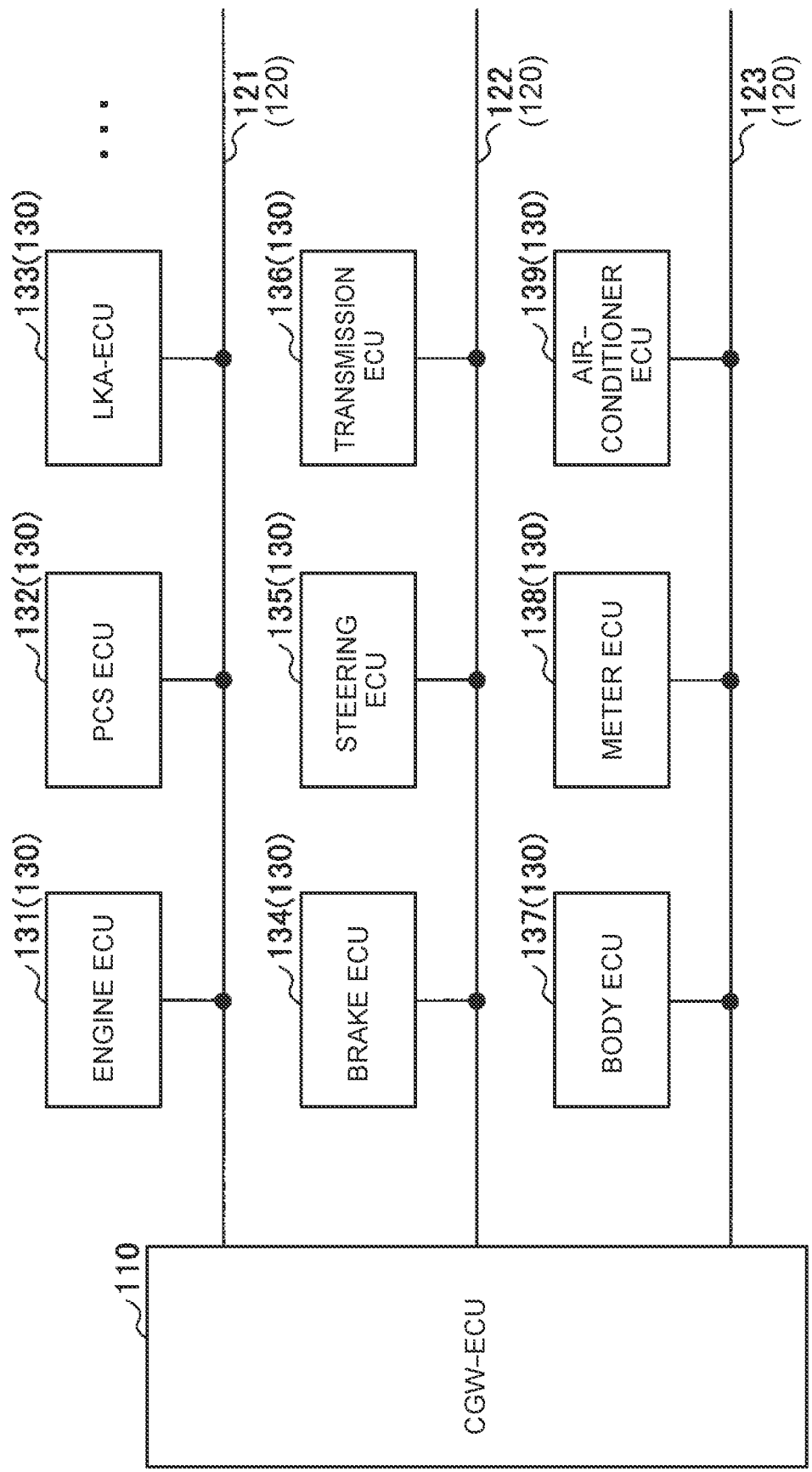
FIG. 1 is a view showing one example of the configuration of an on-board network system of one embodiment.

FIG. 1 shows one example of the configuration of the on-board network system 100 according to the embodiment. The on-board network system 100 includes CGW (Central Gateway)-ECU (Electronic Control Unit) 110, CAN (Controller Area Network) 120, and a plurality of ECUs 130.

The CAN 120 has CAN buses 121, 122, 123. The plurality of ECUs 130 include an engine ECU 131, PCS (Pre-Crash Safety)-ECU 132, LKA (Lane Keeping Assist)-ECU 133, brake ECU 134, steering ECU 135, transmission ECU 136, body ECU 137, meter ECU 138, and an air-conditioner ECU 139.

In the following description, the engine ECU 131, PCS-ECU 132, LKA-ECU 133, brake ECU 134, steering ECU 135, transmission ECU 136, body ECU 137, meter ECU 138, and the air-conditioner ECU 139 will be collectively called "ECUs 131-139".

Also, the engine ECU 131, PCS-ECU 132, LKA-ECU 133, brake ECU 134, steering ECU 135, and the transmission ECU 136 will be collectively called "ECUs 131-136".

When the plurality of ECUs 130 (ECUs 131-139) are not particularly distinguished from one another, each of the ECUs will be called "ECU 130". While ECU(s) other than the ECUs 131-139 may exist, this embodiment will be described using the ECUs 131-139.

Figure 2:
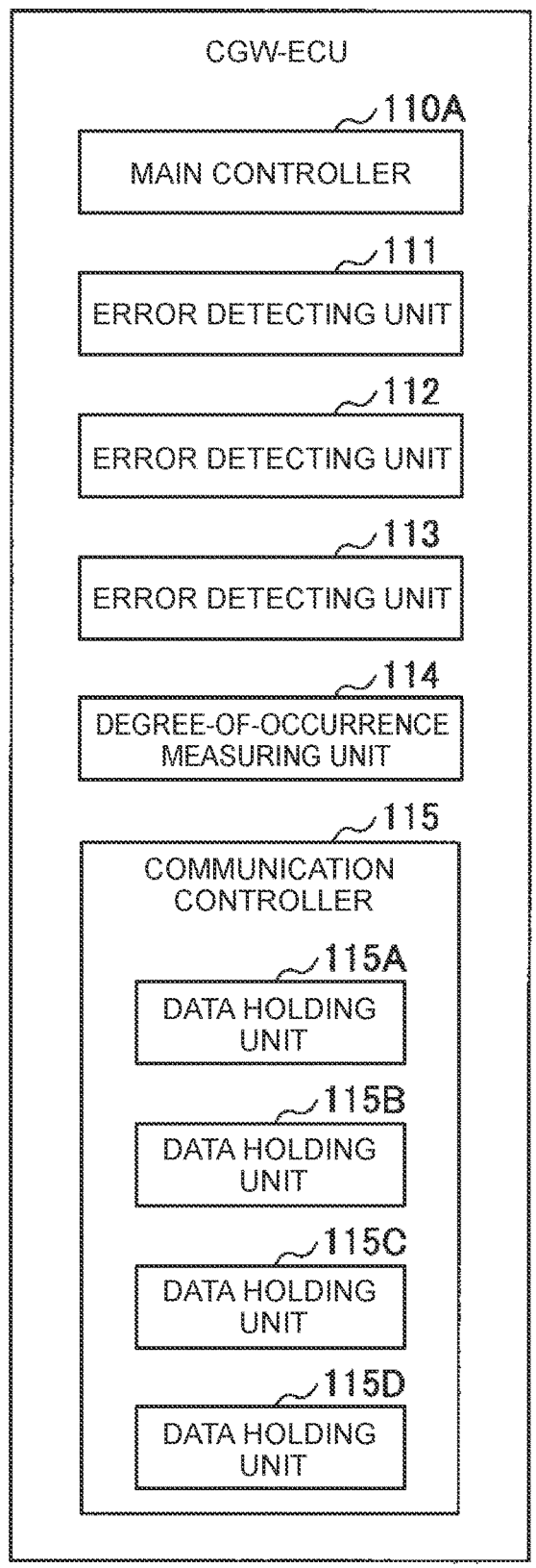
FIG. 2 is a block diagram showing the internal configuration of CGW-ECU.
Figure 3:
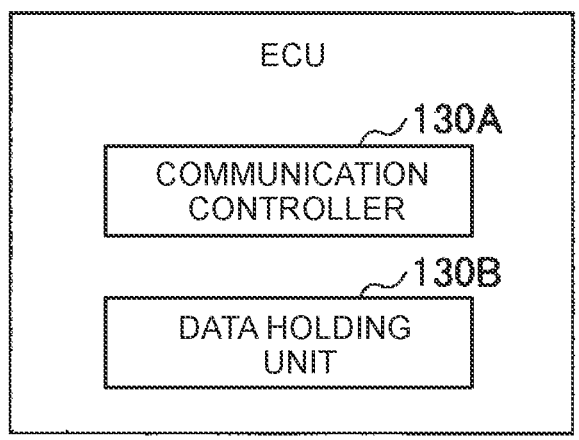
FIG. 3 is a block diagram showing the internal configuration of ECU.

Here, the on-board network system 100 will be described, using FIG. 2 and FIG. 3, in addition to FIG. 1. FIG. 2 is a block diagram showing the internal configuration of the CGW-ECU 110. FIG. 3 is a block diagram showing the internal configuration of each of the ECUs 131-136.

Each of the CGW-ECU 110 and the ECUs 130 is provided by a computer including CPU (Central Processing Unit), RAM (Random Access Memory), ROM (Read Only Memory), clock generating unit, input-output interface, communication interface, transmitting and receiving units, internal bus, and so forth. In FIG. 2 and FIG. 3, functional blocks implemented in the CPU through execution of certain programs are shown.

The on-board network system 100 is installed on a vehicle, and performs communications among the ECUs 130. In the following, the vehicle refers to a vehicle on which the on-board network system 100 is installed, unless otherwise stated.

The CGW-ECU 110 has a main controller 110A, error detecting units 111, 112, 113, degree-of-occurrence measuring unit 114, and a communication controller 115. Also, CAN buses 121, 122, 123 of the CAN 120 are connected to the CGW-ECU 110.

The CGW-ECU 110 relays data which the engine ECU 131, PCS-ECU 132, and the LKA-ECU 133 output to the CAN bus 121, to the CAN buses 122 and 123, and relays data which the brake ECU 134, steering ECU 135, and the transmission ECU 136 output to the CAN bus 122, to the CAN buses 121 and 123. The CGW-ECU 110 also relays data which the body ECU 137, meter ECU 138, and the air-conditioner ECU 139 output to the CAN bus 123, to the CAN buses 121 and 122. The CGW-ECU 110 is one example of relay device, and a gateway device that relays data between the CAN bus 121 and the CAN bus 122.

Thus, the CGW-ECU 110 relays data among the CAN buses 121, 122, 123, so that the ECUs 131-139 can communicate data with each other, via the CAN buses 121, 122, 123.

The transmission speed of data means the speed (data transfer speed) at which data is transferred via the CAN 120.

The main controller 110A is a controller that controls processing of the CGW-ECU 110. One example of the content of processing of the main controller 110A will be described later using the flowchart of FIG. 6.

The error detecting units 111, 112, 113 are connected to the CAN buses 121, 122, 123, respectively, and independently detect an error that occurs in the CAN buses 121, 122, 123. The error detecting units 111, 112, 113 perform error detection, in every control cycle of the CGW-ECU 110.

The error detecting unit 111 detects an error, for example, when a bit error occurs while the CGW-ECU 110 outputs data to the CAN bus 121, or when the CGW-ECU 110 receives an error frame via the CAN bus 121. The CGW-ECU 110 receives an error frame via the CAN bus 121, when a bit error, frame error, or a CRC error occurs in the engine ECU 131, PCS-ECU 132, or the LKA-ECU 133. Thus, the error detecting unit 111 detects an error that occurs in the CAN bus 121.

If the error detecting unit 111 detects an error, it sets an error flag to "1". If the error detecting unit 111 does not detect any error, it sets the error flag to "0". The error flag is "0" when data communicated via the CAN bus 121 is normal.

The error detecting unit 112 detects an error, for example, when a bit error occurs while the CGW-ECU 110 outputs data to the CAN bus 122, or when a bit error, frame error, or a CRC error occurs in the brake ECU 134, steering ECU 135, or the transmission ECU 136, whereby the CGW-ECU 110 receives an error frame via the CAN bus 122. Thus, the error detecting unit 112 detects an error that occurs in the CAN bus 122.

If the error detecting unit 112 detects an error, it sets an error flag to "1", like the error detecting unit 111. If the error detecting unit 112 does not detect any error (if data communicated via the CAN bus 122 is normal), it sets the error flag to "0".

The error detecting unit 113 detects an error, for example, when a bit error occurs while the CGW-ECU 110 outputs data to the CAN bus 123, or when a bit error, frame error, or a CRC error occurs in the body ECU 137, meter ECU 138, or the air-conditioner ECU 139, whereby the CGW-ECU 110 receives an error frame via the CAN bus 123. The error detecting unit 113 sets the error flag in the same manner as the error detecting units 111 and 112.

In this embodiment, the number of times at which an error is detected by the error detecting units 111 and 112 is counted, and the number of times at which an error is detected by the error detecting unit 113 is not counted.

The degree-of-occurrence measuring unit 114 individually and independently counts the numbers of times of error detection by the error detecting units 111 and 112. The number of times of error detection is the number of times of occurrence of an error, and is one example of the degree of occurrence of errors. The count value of the degree-of-occurrence measuring unit 114 represents the number of times of occurrence of an error in the CAN bus 121.

More specifically, the degree-of-occurrence measuring unit 114 counts (increments) the number of times the error detecting unit 111 sets the error flag to "1". If the error detecting unit 111 sets the error flag to "0" when the number of times of error occurrence is one or more, the degree-of-occurrence measuring unit 114 decrements the count value.

Similarly, the degree-of-occurrence measuring unit 114 counts (increments) the number of times the error detecting unit 112 sets the error flag to "1". Namely, the count value of the degree-of-occurrence measuring unit 114 represents the number of times of occurrence of an error in the CAN bus 122. If the error detecting unit 112 sets the error flag to "0" when the number of times of error occurrence is one or more, the degree-of-occurrence measuring unit 114 decrements the count value.

The count value obtained by the degree-of-occurrence measuring unit 114 is held in the RAM, or the like, of the CGW-ECU 110.

The communication controller 115 controls the communication speed and communication data amount of data transferred via the CAN buses 121 and 122, according to the number of times of error occurrence in the CAN buses 121 and 122. The communication controller 115 (CGW-ECU 110) comprehensively performs switching of the communication speed and communication data amount of data transferred via the CAN buses 121 and 122, according to the number of times of error occurrence in the CAN buses 121 and 122.

The ECUs 131-136 switch the communication speed and the communication data amount, according to the communication speed and the communication data amount switched by the communication controller 115, but cannot switch the communication speed and the communication data amount by themselves, if they are not switched by the communication controller 115.

The communication speed and communication data amount of data transferred via the CAN buses 121 and 122 are set to the higher communication speed and the larger communication data volume, in a condition where no error occurs in the CAN buses 121 and 122. As one example, the higher communication speed is 2 Mbps, and the large communication data volume is 32 bytes. The higher communication speed is one example of the first communication speed, and the larger communication data volume is one example of the first communication data amount.

If the number of times of error occurrence in the CAN bus 121, which is counted by the degree-of-occurrence measuring unit 114, becomes equal to or larger than a predetermined number of times N1, the communication controller 115 reduces the communication speed and communication data amount of data which the CGW-ECU 110 outputs to the CAN bus 121 so as to transfer the data to the engine ECU 131 and the PCS-ECU 132. The data output by the CGW-ECU 110 at this stage is one example of the first data. It is determined based on the ID (Identification) included in the data, which of the engine ECU 131 and the PCS-ECU 132 is a destination to which the data is to be transferred.

As a result, the engine ECU 131 or the PCS-ECU 132 reduces the communication speed and communication data amount of data that is output to the CAN bus 121. In this manner, the communication speed and communication data amount of at least one (the engine ECU 131 or the PCS-ECU 132) of the two or more first controllers (the engine ECU 131 and the PCS-ECU 132) connected to the CAN bus 121 are reduced. The data output by the engine ECU 131, PCS-ECU 132 at this stage is one example of the second data.

If the number of times of error occurrence in the CAN bus 121, which is counted by the degree-of-occurrence measuring unit 114, becomes equal to or larger than a predetermined number of times N2 that is larger than the predetermined number of times N1, the communication controller 115 reduces the communication speed and communication data amount of data which the CGW-ECU 110 outputs to the CAN bus 121 so as to transfer the data to the engine ECU 131, PCS-ECU 132, and the LKA-ECU 133. The data which the CGW-ECU 110 outputs to the CAN bus 121 so as to transfer the data to the LKA-ECU 133 at this stage is one example of the fifth data. It is determined based on the ID (Identification) included in the data, which of the engine ECU 131, the PCS-ECU 132, and the LKA-ECU 133 is a destination to which the data is to be transferred.

As a result, the engine ECU 131, PCS-ECU 132, and the LKA-ECU 133 reduce the communication speed and communication data amount of data that is output to the CAN 121. The data output by the LKA-ECU 133 at this stage is one example of the sixth data.

In these cases, the communication controller 115 reduces the communication speed and the communication data amount, such that the communication time of data after the communication speed and communication data amount are reduced becomes equal to or shorter than the communication time of data before the communication speed and communication data amount are reduced. In other words, the communication controller 115 reduces the communication speed and the communication data amount, such that the communication time (the first communication time) of data before the communication speed and communication data amount are reduced becomes longer than the communication time (the second communication time) of data after the communication speed and communication data amount are reduced.

More specifically, as one example, the communication controller 115 reduces the communication speed from the higher communication speed (2 Mbps) to the lower communication speed (500 kbps), and reduces the communication data amount from 32 bytes as the larger volume to 8 bytes as the smaller volume. The lower communication speed is one example of the second communication speed, and the smaller communication data volume is one example of the second communication data amount.

Similarly, if the number of times of error occurrence in the CAN bus 122, which is counted by the degree-of-occurrence measuring unit 114, becomes equal to or larger than the predetermined number of times N1, the communication controller 115 reduces the communication speed and communication data amount of data which the CGW-ECU 110 outputs to the CAN bus 122 so as to transfer the data to the brake ECU 134 and the steering ECU 135. The data output by the CGW-ECU 110 at this stage is one example of the first data. It is determined based on the ID (Identification) included in the data, which of the brake ECU 134 and the steering ECU 135 is a destination to which the data is to be transferred.

As a result, the brake ECU 134 and the steering ECU 135 reduce the communication speed and communication data amount of data that is output to the CAN bus 122. The data output by the brake ECU 134 or the steering ECU 135 at this stage is one example of the second data.

If the number of times of error occurrence in the CAN bus 122, which is counted by the degree-of-occurrence measuring unit 114, becomes equal to or larger than the predetermined number of times N2 that is larger than the predetermined number of times N1, the communication controller 115 reduces the communication speed and communication data amount of data which the CGW-ECU 110 outputs to the CAN bus 122 so as to transfer the data to the brake ECU 134, steering ECU 135, and the transmission ECU 136. The data which the CGW-ECU 110 outputs to the CAN bus 122 so as to transfer the data to the transmission ECU 136 at this stage is one example of the fifth data. It is determined based on the ID (Identification) included in the data, which of the brake ECU 134, the steering ECU 135, and the transmission ECU 136 is a destination to which the data is to be transferred.

As a result, the brake ECU 134, steering ECU 135, and the transmission ECU 136 reduce the communication speed and communication data amount of data that is output to the CAN bus 122. The data output by the transmission ECU 136 at this stage is one example of the sixth data.

With regard to the data transmitted from the CGW-ECU 110 to the CAN bus 122, too, the communication controller 115 reduces the communication speed from the higher communication speed (2 Mbps) to the lower communication speed (500 kbps), and reduces the communication data amount from 32 bytes to 8 bytes.

The on-board network system 100 uses a data frame (CAN-FD frame) according to the CAN-FD (CAN with Flexible Data) standards, and a data frame (CAN frame) according to the CAN standards. The CAN-FD frame is used for data communication of the larger volume of communication data at the higher communication speed, and the CAN frame is used for data communication of the smaller volume of communication data at the lower communication speed. Switching between the CAN-FD frame and the CAN frame is performed by changing a value of FDF (Flexible Data Format) included in a control field of the CAN-FD frame and the CAN frame.

When the value of FDF is "1", the data format is set to the CAN-FD frame with the higher communication speed (2 Mbps) and the larger volume of communication data (32 bytes). When the value of FDF is "0", the data format is set to the CAN frame with the lower communication speed (500 kbps) and the smaller volume of communication data (8 bytes).

The communication controller 115 has data holding units 115A, 115B, 115C, 115D. The data holding unit 115A holds a value set to the FDF of data transmitted from the CGW-ECU 110 to the engine ECU 131 or the PCS-ECU 132 via the CAN bus 121. The data holding unit 115B holds a value set to the FDF of data transmitted from the CGW-ECU 110 to the LKA-ECU 133 via the CAN bus 121.

The data holding unit 115C holds a value set to the FDF of data transmitted from the CGW-ECU 110 to the brake ECU 134 or the steering ECU 135 via the CAN bus 122. The data holding unit 115D holds a value set to the FDF of data transmitted from the CGW-ECU 110 to the transmission ECU 136 via the CAN bus 122.

When control of the CGW-ECU 110 is started, the FDF values of all data transferred via the CAN buses 121 and 122 are set to "1", and the values stored in the data holding units 115A-115D are also set to "1". In a condition where no error occurs in the CAN buses 121 and 122, the FDF values of all data transferred via the CAN buses 121 and 122, and the values stored in the data holding units 115A-115D are held (kept) at "1".

When the number of times of error occurrence in the CAN bus 121 is smaller than the predetermined number of times N1, the communication controller 115 holds (keeps) the values of the data holding units 115A and 115B at "1".

When the number of times of error occurrence in the CAN bus 121 is equal to or larger than the predetermined number of times N1, and is smaller than the predetermined number of times N2, the communication controller 115 sets the value of the data holding unit 115A to "0", and holds (keeps) the value of the data holding unit 115B at "1".

When the number of times of error occurrence in the CAN bus 121 is equal to or larger than the predetermined number of times N2, the communication controller 115 sets the values of the data holding units 115A and 115B to "0".

Similarly, when the number of times of error occurrence in the CAN bus 122 is smaller than the predetermined number of times N1, the communication controller 115 holds (keeps) the values of the data holding units 115C and 115D at "1".

When the number of times of error occurrence in the CAN bus 122 is equal to or larger than the predetermined number of times N1, and is smaller than the predetermined number of times N2, the communication controller 115 sets the value of the data holding unit 115C to "0", and holds (keeps) the value of the data holding unit 115D at "1".

When the number of times of error occurrence in the CAN bus 122 is equal to or larger than the predetermined number of times N2, the communication controller 115 sets the values of the data holding units 115C and 115D to "0".

To reduce the communication data amount from 32 bytes to 8 bytes (reduce it to one-fourth), one piece of data in the format of CAN-FD frame in which the data field has a data amount of 32 bytes is divided into four, and four pieces of data in the format of CAN frame in which the data field has a data amount of 8 bytes are produced.

By dividing the data and changing the data format from the CAN-FD frame to the CAN frame in the above manner, the communication time of one CAN frame after the division is made equal to or shorter than the communication time of one CAN-FD frame before the division. With the data thus divided, the communication data amount can be easily reduced, and the data having the reduced communication data amount can be easily managed. The manner of making the communication time after the division equal to or shorter than the communication time before the division will be described later using FIG. 4 and FIG. 5.

When the data communicated via the CAN buses 121 and 122 is normal, the degree-of-occurrence measuring unit 114 decrements the count value representing the number of times of error occurrence. Thus, the count value may be reduced after it becomes equal to or larger than the predetermined number of times N1 or the predetermined number of times N2.

Then, as a result of decrement of the count value, the number of times of error occurrence counted by the degree-of-occurrence measuring unit 114 with respect to the CAN bus 121 or 122 may return to 0.

In this case, the communication controller 115 returns the value of the data holding units 115A, 115B, or the value of the data holding units 115C, 115D, to "1", and returns the communication speed and communication data amount of data that is output to the CAN bus 121 or 122, to the higher communication speed and the larger communication data volume.

If the count value of the degree-of-occurrence measuring unit 114 with respect to the CAN bus 121 returns from a condition where it is equal to or larger than the predetermined number of times N1 and is smaller than the predetermined number of times N2, to zero, the communication speed and communication data amount of data transmitted from the CGW-ECU 110 to the engine ECU 131 or the PCS-ECU 132 are returned to the higher communication speed and the larger communication data volume. The data transmitted from the CGW-ECU 110 (communication control unit 115) at this stage is one example of the third data.

As a result, the communication speed and communication data amount of data which the engine ECU 131 or the PCS-ECU 132 outputs to the CAN bus 121 also return to the higher communication speed and the larger communication data volume. The data which the engine ECU 131 or the PCS-ECU 132 outputs to the CAN bus 121 at this stage is one example of the fourth data.

If the count value of the degree-of-occurrence measuring unit 114 with respect to the CAN bus 121 returns from a condition where it is equal to or larger than the predetermined number of times N2, to zero, the communication speed and communication data amount of data transmitted from the CGW-ECU 110 to the engine ECU 131, PCS-ECU 132, or the LKA-ECU 133 are returned to the higher communication speed and the larger communication data volume. The data which the CGW-ECU 110 outputs to the CAN bus 121 so as to transfer the data to the LKA-ECU 133 at this stage is one example of the seventh data.

As a result, the communication speed and communication data amount of data which the engine ECU 131, the PCS-ECU 132, or the LKA-ECU 133 outputs to the CAN bus 121 also return to the higher communication speed and the larger communication data volume. The data that is output by the LKA-ECU 133 at this stage is one example of the eighth data.

Similarly, if the count value of the degree-of-occurrence measuring unit 114 with respect to the CAN bus 122 returns from a condition where it is equal to or larger than the predetermined number of times N1 and is smaller than the predetermined number of times N2, to zero, the communication speed and communication data amount of data transmitted from the CGW-ECU 110 to the brake ECU 134 or the steering ECU 135 are returned to the higher communication speed and the larger communication data volume. The data transmitted from the CGW-ECU 110 (communication control unit 115) at this stage is one example of the third data.

As a result, the communication speed and communication data amount of data which the brake ECU 134 or the steering ECU 135 outputs to the CAN bus 122 also return to the higher communication speed and the larger communication data volume. The data which the brake ECU 134 or the steering ECU 135 outputs to the CAN bus 122 at this stage is one example of the fourth data.

If the count value of the degree-of-occurrence measuring unit 114 with respect to the CAN bus 122 returns from a condition where it is equal to or larger than the predetermined number of times N2, to zero, the communication speed and communication data amount of data transmitted from the CGW-ECU 110 to the brake ECU 134, steering ECU 135, or the transmission ECU 136 are returned to the higher communication speed and the larger communication data volume. The data which the CGW-ECU 110 outputs to the CAN bus 122 so as to transfer the data to the transmission ECU 136 at this stage is one example of the seventh data.

As a result, the communication speed and communication data amount of data which the brake ECU 134, steering ECU 135, or the transmission ECU 136 outputs to the CAN bus 122 also return to the higher communication speed and the larger communication data volume. The data that is output by the transmission ECU 136 at this stage is one example of the eighth data.

As described above, the communication time of data after the communication speed and the communication data amount are reduced is made equal to or shorter than the communication time of data before the communication speed and the communication data amount are reduced, so as to prevent data which the CGW-ECU 110 outputs to the CAN bus 121 or 122, or data which the ECU (any of the ECUs 131-136) that received the data outputs to the CAN bus 121 or 122 at the lower communication speed, from causing a communication delay or a communication failure of another ECU (any of the ECUs 131-136).

The engine ECU 131, PCS-ECU 132, and the LKA-ECU 133 are connected to the CAN bus 121 of the CAN 120, and the brake ECU 134, steering ECU 135, and the transmission ECU 136 are connected to the CAN bus 122, while the body ECU 137, meter ECU 138, and the air-conditioner ECU 139 are connected to the CAN bus 123.

With the CAN buses 121, 122, 123 thus connected by the CGW-ECU 110 as described above, the CAN 120 constructs an on-board network that permits mutual communications among a plurality of ECUs 130, according to the CAN-FD protocol.

With regard to the CAN buses 121 and 122, among the CAN buses 121, 122, 123, the communication speed and the communication data amount are switched by the communication controller 115 as described above. The CAN buses 121, 122 are respective examples of the first bus and the second bus. In the CAN bus 123, data is communicated at the lower communication speed.

In the CAN bus 123, data communications using the CAN frame with the lower communication speed and the smaller communication data volume are performed, irrespective of the occurrence of errors. As one example, the lower communication speed is 500 kbps, and the smaller communication data volume is 8 bytes. The value of the FDF of data transferred via the CAN bus 123 is always held at "0".

The ECUs 131-139 are control units that perform control of the vehicle. The engine ECU 131, PCS-ECU 132, LKA-ECU 133, brake ECU 134, steering ECU 135, and the transmission ECU 136 are traveling-related ECUs, namely, ECUs that perform control (associated with running, turning and stopping) related to traveling of the vehicle. The body ECU 137, meter ECU 138, and the air-conditioner ECU 139 are non-traveling-related ECUs, namely, ECUs that perform control other than the control (associated with running, turning and stopping) related to traveling of the vehicle.

The ECUs 131-139 are mere examples, and other types of ECUs may be further connected to the CAN buses 121, 122, 123.

Among the ECUs 131-139, the engine ECU 131 and PCS-ECU 132 connected to the CAN bus 121, and the brake ECU 134 and steering ECU 135 connected to the CAN bus 122 are examples of a plurality of first controllers, and the LKA-ECU 133 and the transmission ECU 136 are examples of second controller.

Among the ECUs 131-139, each of the ECUs 131-136 (see FIG. 3) has a communication controller 130A (see FIG. 3) and a data holding unit 130B.

The communication controller 130A sets the format of data to be output to the CAN bus 121 or 122, to the CAN-FD frame with the higher communication speed and the larger communication data volume, or the CAN frame with the lower communication speed and the smaller communication data volume, by referring to the one-bit value of the FDF in the control field of data received via the CAN bus 121 or 122.

When the value of the FDF of the data received from the CGW-ECU 110 is "0", the communication controller 130A sets the data format to the CAN frame with the lower communication speed (500 kbps), and the smaller communication data volume (8 bytes). When the value of the FDF of the data received from the CGW-ECU 110 is "1", the communication controller 130A sets the data format to the CAN-FD frame with the higher communication speed (2 Mbps), and the larger communication data volume (32 bytes).

The data holding unit 130B holds the value of the FDF of data received from the CGW-ECU 110. The communication controller 130A sets the value stored in the data holding unit 130B, as a value of the FDF of data which each of the ECUs 131-136 outputs to the CAN bus 121 or 122.

When control of the CGW-ECU 110 is started, the data holding unit 130B holds "1". Then, if the communication controller 130A receives data of which the value of the FDF is "0", from the CGW-ECU 110, the data holding unit 130B holds the value of "0". If the communication controller 130A receives data of which the value of the FDF is "1" from the CGW-ECU 110, in a condition where the data holding unit 130B holds "0", the data holding unit 130B returns the value held therein to "1". It is determined based on the ID of the data that the data is received from the CGW-ECU 110.

The engine ECU 131 controls the output or power of the engine, based on the accelerator pedal stroke, vehicle speed, etc. In the case where the vehicle is a hybrid vehicle (HV), or an electric vehicle (EV), an HV-ECU that controls the output of an engine or a motor for driving, or an EV-ECU that controls the output of a motor for driving, may be used. The accelerator pedal stroke is detected by an accelerator position sensor, and the vehicle speed is detected by a vehicle speed sensor.

The PCS-ECU 132 raises an alarm (PCS alarm) for avoiding collision with an obstacle in front of the vehicle, based on the vehicle speed, distance between the vehicle and the obstacle in front of the vehicle, etc., and controls operation of an automatic brake (which will be called "PCS brake") for avoiding collision with the obstacle. The distance between the vehicle and an obstacle in front of the vehicle is detected by a millimeter-wave radar device and a monocular camera, for example. The distance between the vehicle and an obstacle in front of the vehicle may also be detected by use of a stereo camera.

The LKA-ECU 133 performs control of the steering angle, based on an image in front of the vehicle, which is detected by a monocular camera, for example, so that the vehicle does not depart from a lane on which it is traveling.

The brake ECU 134 performs control for implementing the function of ABS (Anti-lock Brake System) and the function of VSC (Vehicle Stability Control), based on the hydraulic pressure detected by a hydraulic pressure sensor provided in a master cylinder, for example. The brake ECU 134 cooperates with the PCS-ECU 131 to control the PCS brake.

The steering ECU 135 performs control of an electric motor for assisting in electric power steering, based on the vehicle speed and the steering torque. The steering torque is detected by a torque sensor that detects torque applied to the steering wheel by the driver.

The transmission ECU 136 controls gearshift, etc. of the transmission, according to the operation of a shift lever and the vehicle speed, for example. The transmission may be an automatic transmission using a torque converter, CVT (Continuously Variable Transmission, belt-type stepless transmission), or the like.

The body ECU 137 determines an open/closed state of each door of the vehicle, performs opening/closing control, etc. of side windows, for example.

The meter ECU 138 performs control of various meters, such as a speed meter and a tachometer, on a meter panel of the vehicle, various alarm lamps, and so forth.

The air-conditioner ECU 139 performs control of an air conditioner that controls the temperature and humidity of air in the vehicle interior.

Figure 4:
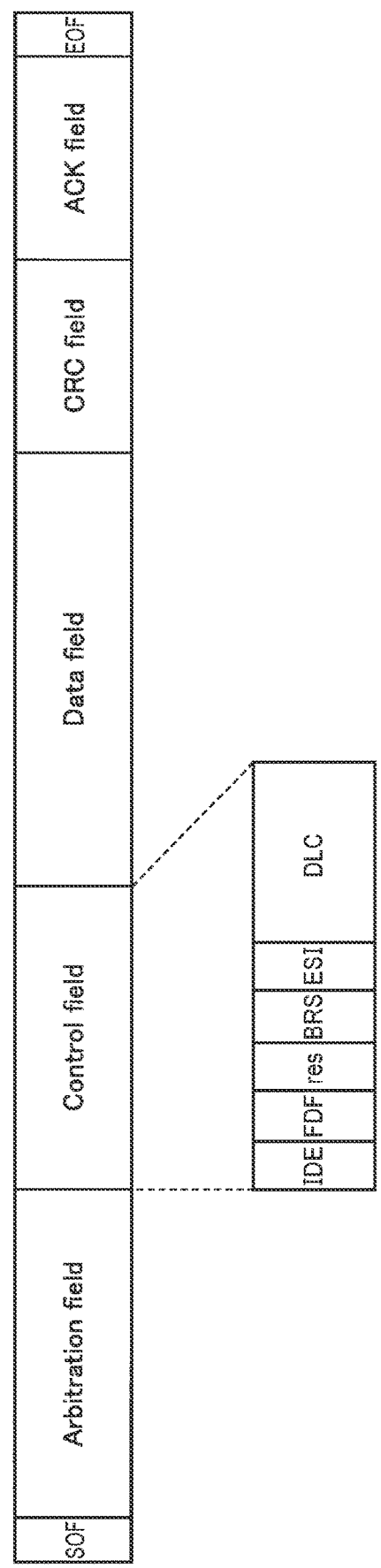
FIG. 4 is a view showing one example of CAN-FD frame in a CAN-FD format.

FIG. 4 shows one example of CAN-FD frame in the CAN-FD format.

A CAN-FD frame (data frame) in the format (CAN-FD format) of the CAN-FD protocol has SOF (Start Of Frame), arbitration field, control field, data field, CRC field, ACK field, and EOF (End Of Frame). Among these fields, the arbitration field includes ID (identifier).

The ID is used for identifying the data content, transmission node, etc., and is also used for determining the order of priority in communication arbitration (arbitration when CAN-FD frames are simultaneously output from two or more nodes to the CAN buses 121-123) in the CAN 120. As the ID is smaller, the order of priority is higher. In this example, the node refers to each of the CGW-ECU 110, and the ECUs 131-139.

The ECUs 131-139 transmit and receive CAN-FD frames in the CAN 120, according to the IDs assigned the ECUs in advance, so that the ECUs 131-139 can identify the CAN-FD frames on the CAN 120 (CAN buses 121, 122, 123) and receive necessary data.

The control field includes IDE (Identifier Extension), DLC (Data Length Code), BRS (Bit Rate Switch), ESI (Error State Indicator), and FDF (Flexible Data Format). As described above, the CGW-ECU 110 uses the value of the FDF (1 bit), for switching the communication speed and communication data amount of data. Since the CAN-FD fame is used for data communication with the higher communication speed and the larger communication data volume, the value of BRS is held at "1" (indicating the higher bit rate).

In the case of data of the CAN-FD frame, the data field can hold a maximum of 64 bytes of data, for example. As one example, the CGW-ECU 110 permits the CAN-FD frame (data field) to hold 32 bytes. Various control data to be used by the ECU 131-139 is written in the data field, and transmitted via the CAN 120.

The CAN-FD frame includes 22 bits of data from the SOF to the DLC of the control field, and 36 bits of data from the CRC field to the EOF.

Figure 5:
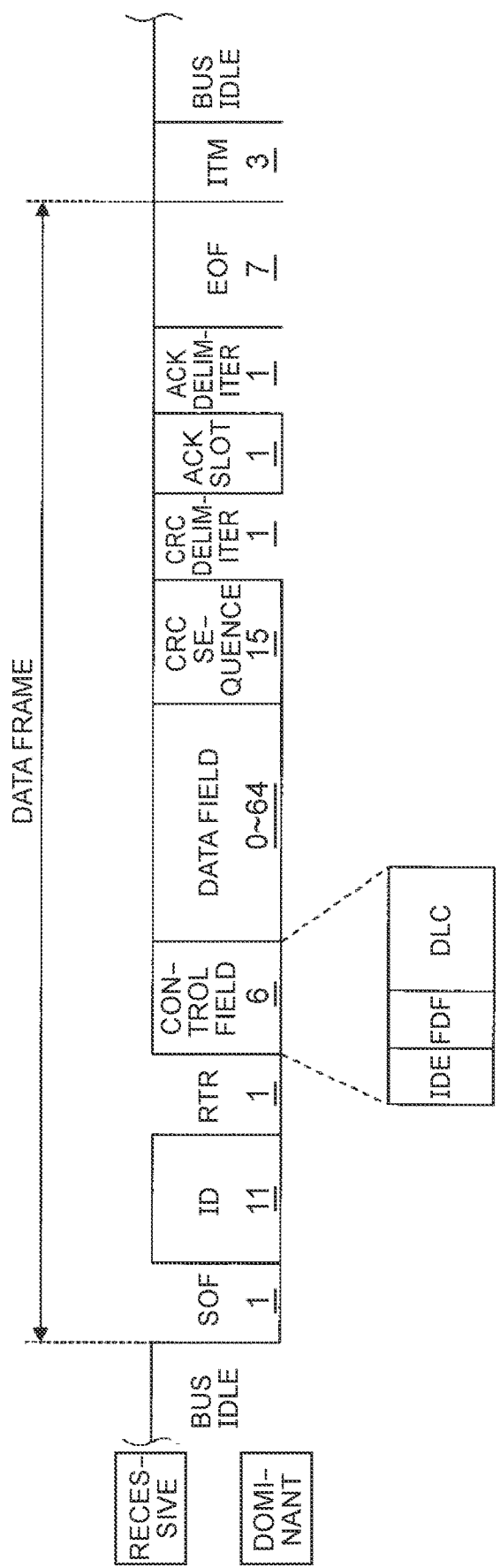
FIG. 5 is a view showing one example of CAN frame in a CAN format.

FIG. 5 shows one example of CAN frame in the CAN format.

The CAN frame (data frame) in the standard format of the CAN protocol has SOF, ID, RTR (Remote Transmission Request), control field, data field, CRC sequence, CRC delimiter, ACK slot, ACK delimiter, and EOF.

Data to be transmitted by the CAN frame is included in the data field, and the CAN frame can transmit a maximum of 8 bytes of data in terms of bytes. The length of data included in the CAN frame is set between 1 and 8, using 4 bits of DLC (Data Length Code) in the control field. In this embodiment, the data length is set to 8 bytes.

In the data field of the CAN frame, data into which data in the data field of the CAN-FD frame is divided is written.

Like the control field of the CAN-FD frame, the control field of the CAN frame has IDE and FDF, and further has DLC. In the CAN frame, the value of the FDF is set to "0". If the value of the FDF is changed from "0" to "1", the data frame becomes the CAN-FD frame shown in FIG. 4. If the value of the FDF is set to "0", the data frame becomes the CAN frame shown in FIG. 5.

The CAN frame includes 18 bits of data from the SOF to the DLC of the control field, and 25 bits of data from the CRC sequence to the EOF. If 8 bytes of data is written into the data field of the CAN frame, and is transmitted at 500 kbps, the communication time of one frame is about 222 μs (microseconds). In the meantime, if 32 bytes of data is written into the data field of the CAN-FD frame as described above, and is transmitted at 2 Mbps, the communication time of one frame is about 239.2 (microseconds).

Thus, the communication time (about 222 μs) of one frame in the case where 8 bytes of data is written into the data field of the CAN frame and transmitted at 500 kbps is shorter than the communication time (about 239.2 μs) of one frame in the case where 32 bytes of data is written into the data field of the CAN-FD frame and transmitted at 2 Mbps. While the combination of 8 bytes and 500 kbps is compared with the combination of 32 bytes and 2 Mbps in this example, the disclosure is not limited to these combinations of numerical values.

In this embodiment, the communication speeds and communication data amounts before and after they are reduced are only required to be set, such that the communication time of data after the communication speed and communication data amount are reduced becomes equal to or shorter than the communication time of data before the communication speed and communication data amount are reduced.

Figure 6:
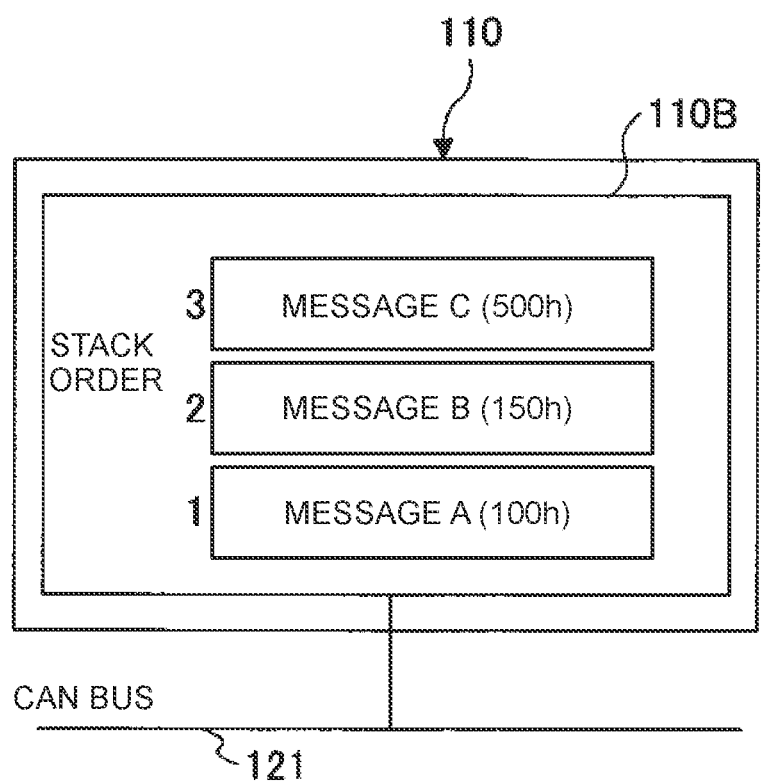
FIG. 6 is a view useful for explaining operation of the CGW-ECU when it outputs data to a CAN bus.

FIG. 6 is a view useful for explaining processing of the CGW-ECU 110 when it outputs data to the CAN bus 121. A buffer 110B shown in FIG. 6 is a buffer corresponding to the CAN bus 121, and is provided by the RAM of the CGW-ECU 110. The CGW-ECU 110 also has two buffers corresponding to the CAN buses 122 and 123, though the buffers are not illustrated in FIG. 6.

In the buffer 110B of the CGW-ECU 110, data (messages) A, B, C that are ready to be output to the CAN bus 121 are stacked. Among these data A, B, C, data A is the oldest data, and data C is the newest data.

In this case, the CGW-ECU 110 outputs data, beginning with the oldest data, to the CAN bus 121. Namely, data A is initially output to the CAN bus 121, and then data B is output to the CAN bus 121. Then, data C is output to the CAN bus 121.

The IDs of data A, B, and C are 100h, 150h, and 500h, respectively. As the ID is smaller, the order of priority is higher; therefore, the priority of data A is the highest. The priority of data B is the second highest, and the priority of data C is the lowest among the three data A, B, C. In the buffer 110B, other newer data can be actually stacked, following the data A, B, C. As one example, the buffer 110B has a data capacity that allows the buffer 110B to store five data.

As the number of times of error occurrence in the CAN bus 121 becomes closer to the predetermined number of times N1, a high-priority ID (ID having a small value) is assigned to data transmitted to the engine ECU 131 and the PCS-ECU 132, according to the protocol of CAN-FD.

Therefore, as one example, data A is to be transmitted to the engine ECU 131, and data B is to be transmitted to the PCS-ECU 132, while data C is to be transmitted to the LKA-ECU 133. Since ECUs other than the engine ECU 131, PCS-ECU 132, and the LKA-ECU 133 can be connected to the actual CAN bus 121, the destination of data C may be an ECU connected to the CAN bus 121, other than the engine ECU 131, PCS-ECU 132, and the LKA-ECU 133.

If the number of times of error occurrence in the CAN bus 121 becomes equal to or larger than the predetermined number of times N1, in a condition where the data A, B, C are stored in the buffer 110B as shown in FIG. 6, the CGW-ECU 110 sets the value of the FDF to "0", with respect to data A, B that are to be transmitted to the engine ECU 131 and the PCS-ECU 132, respectively, when the CGW-ECU 110 outputs the data stacked in the buffer 110B, beginning with the oldest data, to the CAN bus 121. With regard to data C that is to be transmitted to the LKA-ECU 133, the value of the FDF is held at "1".

As a result, data A and B are output to the CAN bus 121, as data in the CAN frame format with the lower communication speed and the smaller communication data volume, and data C is output to the CAN bus 121 as data in the CAN-FD frame with the higher communication speed and the larger communication data volume.

Then, the engine ECU 131 and the PCS-ECU 132 that respectively receive data A, B (in the CAN frame format) at the lower communication speed in the smaller communication data volume output data (in the CAN frame format) at the lower communication speed in the smaller communication data volume, to the CAN bus 121. Also, the LKA-ECU 133 that receives data C (in the CAN-FD frame format) at the higher communication speed in the larger communication data volume outputs data (in the CAN-FD frame format) at the higher communication speed in the larger communication data volume, to the CAN bus 121.

If no error occurs in the CAN bus 121 (if data is normally communicated), and the number of times of error occurrence is decremented from the predetermined number of times N1 in two or more control cycles, until the number of times of error occurrence in the CAN bus 121 becomes equal to zero, the CGW-ECU 110 returns the value of the FDF of data (not shown in FIG. 6) to be transmitted to the engine ECU 131 or the PCS-ECU 132, to "1". As a result, data (in the CAN-FD frame format) is output to the CAN bus 121 at the higher communication speed in the larger communication data volume, so as to be transmitted to the engine ECU 131 or the PCS-ECU 132.

Then, the engine ECU 131 or the PCS-ECU 132 which has received the data at the higher communication speed in the larger communication data volume will output data (in the CAN-FD frame format) at the higher communication speed in the larger communication data volume, to the CAN bus 121.

In this example, the data A, B, C are stacked in the buffer 110B, such that the oldest data A is given the highest priority, and the newest data C is given the lowest priority. Even if the order of stacking of the data A, B, C in the buffer 110B is different from that of this example, the concept and manner of setting the value of the FDF is the same as that of the above example, except that the order of output of the data from the buffer 110B to the CAN bus 121 is changed.

While the above description is concerned with the buffer 110B corresponding to the CAN bus 121, it is also applied to a buffer corresponding to the CAN bus 122.

If the number of times of error occurrence in the CAN bus 121 becomes closer to the predetermined number of times N2, from a condition where it is equal to the predetermined number of times N1, the high-priority ID (ID having a small value) is also assigned to data to be transmitted to the LKA-ECU 133, in addition to data to be transmitted to the engine ECU 131 and the PCS-ECU 132, according to the CAN-FD protocol.

Therefore, in a condition where the data A, B, C are stored in the buffer 110B, the value of the ID assigned to data C that is to be transmitted to the LKA-ECU 133 is set to a smaller value (for example, 200h).

Then, if the number of times of error occurrence in the CAN bus 121 becomes equal to or larger than the predetermined number of times N2, the CGW-ECU 110 sets the value of the FDF with respect to data A, B, C that are to be transmitted to the engine ECU 131, PCS-ECU 132, and the LKA-ECU 133, to "0", when the CGW-ECU 110 outputs the data stacked in the buffer 110B to the CAN bus 121, beginning with the oldest data.

As a result, the data A, B, C are output to the CAN bus 121 as data in the CAN frame format with the lower communication speed and the smaller communication data volume.

Then, the engine ECU 131, PCS-ECU 132, and the LKA-ECU 133 that have respectively received the data A, B, C transmitted at the lower communication speed, in the smaller communication data volume, output data (in the CAN frame format) to the CAN bus 121 at the lower communication speed, in the smaller communication data volume.

If no error occurs in the CAN bus 121 (if data is normally communicated), and the number of times of error occurrence is decremented from the predetermined number of times N2 in two or more control cycles, until the number of times of error occurrence in the CAN bus 121 becomes equal to zero, the CGW-ECU 110 returns the value of the FDF of the data A, B, C to be transmitted to the engine ECU 131, PCS-ECU 132, and the LKA-ECU 133, to "1".

As described above, if the number of times of error occurrence in the CAN bus 121 becomes equal to or larger than the predetermined number of times N1, the CGW-ECU 110 sets the value of the FDF with respect to data A, B to be transmitted to the engine ECU 131 and the PCS-ECU 132, to "0".

Also, if the number of times of error occurrence in the CAN bus 121 becomes equal to or larger than the predetermined number of times N2, the CGW-ECU 110 sets the value of the FDF with respect to data A, B, C to be transmitted to the engine ECU 131, PCS-ECU 132, and the LKA-ECU 133, to "0".

Then, if the number of times of error occurrence in the CAN bus 121 returns to zero, the CGW-ECU 110 returns the value of the FDF with respect to data A, B, C to be transmitted to the engine ECU 131, PCS-ECU 132, and the LKA-ECU 133, to "1".

The processing as described above is also applied to the brake ECU 134, steering ECU 135, and the transmission ECU 136, which are connected to the CAN bus 122.

Figure 7:
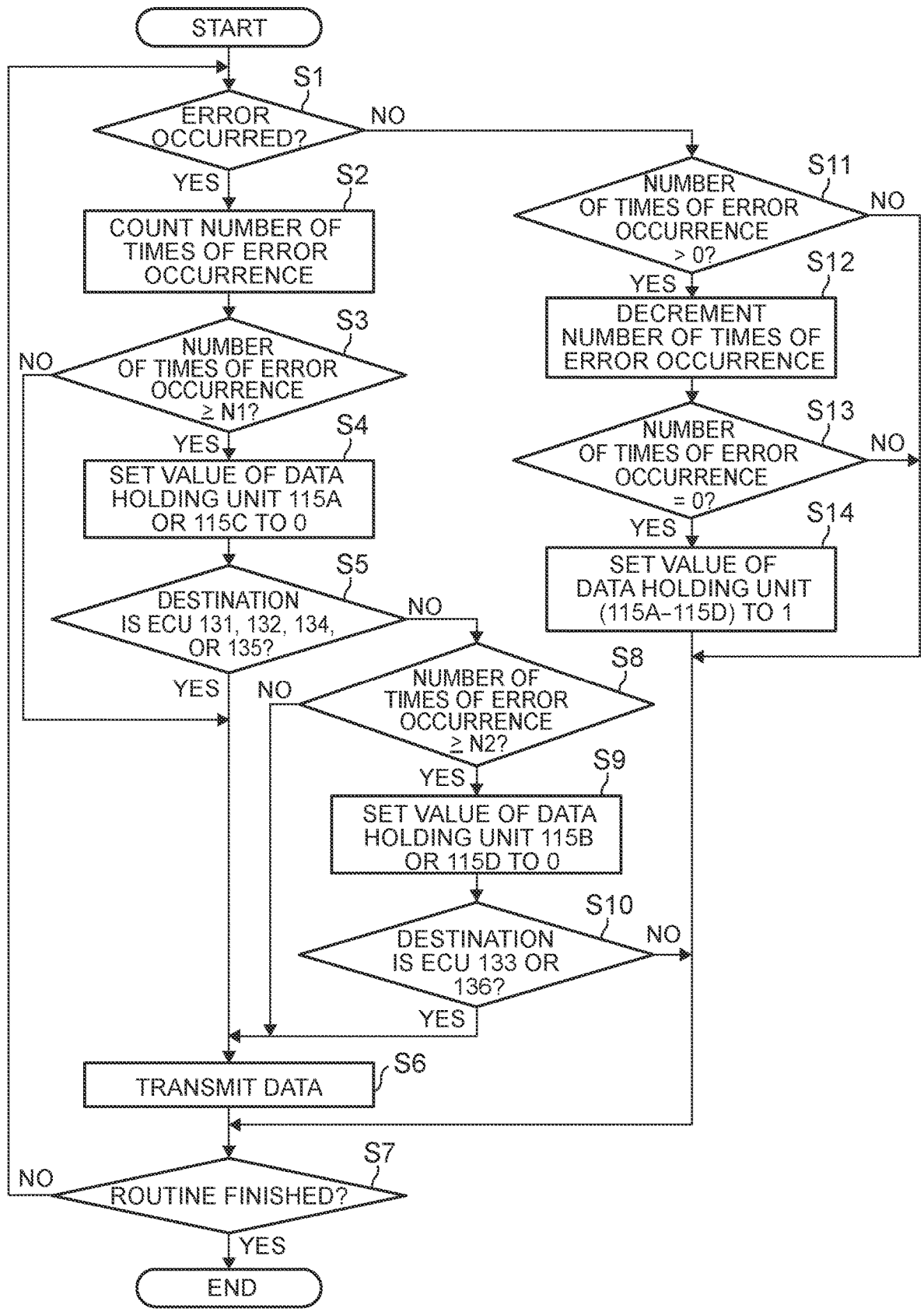
FIG. 7 is a flowchart illustrating a control routine executed by the CGW-ECU.

FIG. 7 is a flowchart illustrating a control routine executed by the CGW-ECU 110. The control routine shown in FIG. 7 cooperates with a control routine shown in FIG. 8 and described later, to realize a communication control method of controlling communications in the on-board network system.

When the ignition switch of the vehicle is turned on, the communication controller 115 starts the control routine of FIG. 7. As a precondition under which the routine or flow starts, the value of the FDF of all data transferred via the CAN buses 121 and 122 is set to "1". Also, the value of the FDF held in the data holding units 115A-115D of the communication controller 115 is also set to "1".

In the case of a gasoline engine vehicle, the ignition switch is a switch that is operated by the user of the vehicle, for switching the status of a power supply to each part of the vehicle when the engine is started and stopped. In the case of an HV vehicle or an EV vehicle, an engine or a motor for driving, or a motor for driving, is subjected to switching by the ignition switch, in place of the engine.

The main controller 110A determines whether an error occurs in the CAN bus 121 or 122 (step S1). Any error in the CAN bus 121 or 122 is detected by the error detecting unit 111 or 112, respectively.

If the main controller 110A determines that an error occurs in the CAN bus 121 or 122 (S1: YES), the degree-of-occurrence measuring unit 114 individually and independently counts the numbers of times of error detection by the error detecting units 111 and 112 (step S2).

In step S2, if an error occurs in the CAN bus 121, the degree-of-occurrence measuring unit 114 increments the count value of the number of times of error occurrence in the CAN bus 121. If an error occurs in the CAN bus 122, the degree-of-occurrence measuring unit 114 increments the count value of the number of times of error occurrence in the CAN bus 122. If errors occur in both of the CAN buses 121 and 122, the count values for both of the CAN buses 121 and 122 may be incremented.

The communication controller 115 determines whether the number of times of error occurrence in the CAN bus 121 or 122 is equal to or larger than the predetermined number of times N1 (step S3). In step S3, the communication controller 115 determines whether the count value with respect to the CAN bus 121 or 122, which is counted in step S2 by the degree-of-occurrence measuring unit 114, is equal to or larger than the predetermined number of times N1. The value of the predetermined number of times N1 may be set to an appropriate value by experiment or simulation, for example.

If the communication controller 115 determines that the number of times of error occurrence in the CAN bus 121 or 122 is equal to or larger than the predetermined number of times N1 (S3: YES), it sets the value of the data holding unit 115A or 115C corresponding to the CAN bus 121 or 122 in which the number of times of error occurrence is equal to or larger than the predetermined number of times N1, to "0" (step S4). This is because data is communicated at the lower communication speed, in the smaller communication data volume, in the CAN bus 121 or 122 in which the number of times of error occurrence is equal to or larger than the predetermined number of times N1.

The communication controller 115 determines whether there is any data to be transmitted to one of the engine ECU 131, PCS-ECU 132, brake ECU 134, and the steering ECU 135, among data that is stored in the buffer 110B of the CGW-ECU 110 and is ready to be transmitted (transferred) (step S5).

If the communication controller 115 determines that there is data of which the destination is one of the engine ECU 131, PCS-ECU 132, brake ECU 134, and the steering ECU 135 (S5: YES), the main controller 110A transmits the data stacked in the buffer 110B, sequentially from the older data in chronological order (step S6).

In each control cycle, one data is transmitted in step S6. With the control cycle repeated, the data stacked in the buffer 110B is transmitted, sequentially from the older data. If there is no data stacked in the buffer 110B, data transmitting operation is not performed. The order of transmission of data has been described above using FIG. 6.

The main controller 110A determines whether the control routine is to be finished (step S7). The control routine is finished when the ignition switch of the vehicle is turned off. If it is determined that the control routine is to be finished (S7: YES), the series of steps stop being executed (END). On the other hand, if it is determined that the control routine is not to be finished (S7: NO), the main controller 110A returns to step S1.

If it is determined in step S5 that there is no data to be transmitted to the engine ECU 131, PCS-ECU 132, brake ECU 134, or the steering ECU 135 (S5: NO), the communication controller 115 determines whether the number of times of error occurrence in the CAN bus 121 or 122 is equal to or larger than the predetermined number of times N2 (step S8).

The number of times (count value) of error occurrence determined by the communication controller 115 in step S8 is the count value read in step S2 by the main controller 110A. In the case where there is no data that is ready to be transmitted (transferred), in the buffer 110B of the CGW-ECU 110, too, it is determined in step S5 that there is no data (S5: NO), and the control proceeds to step S8.

If the communication controller 115 determines that the number of times of error occurrence in the CAN bus 121 or 122 is equal to or larger than the predetermined number of times N2 (S8: YES), the value of the data storing unit 115B or 115D corresponding to the CAN bus 121 or 122 of which the number of times of error occurrence is equal to or larger than the predetermined number of times N2 is set to "0" (step S9). This step is executed for the purpose of communicating data at the lower communication speed, in the smaller communication data volume.

The communication controller 115 determines whether there is any data to be transmitted to the LKA-ECU 133 or the transmission ECU 136 (step S10).

If it is determined that there is data that is to be transmitted to the LKA-ECU 133 or the transmission ECU 136 (S10: YES), the main controller 110A proceeds to step S6. As a result, data is transmitted (transferred) at the lower communication speed, in the smaller communication data volume, to the ECU (133 or 136) found in step S10.

If the communication controller 115 determines in step S3 that the number of times of error occurrence in the CAN bus (121 or 122) is not equal to or larger than the predetermined number of times N1 (S3: NO), the main controller 110A proceeds to step S6. This because that the value of the FDF may be held at "1".

If the main controller 110A determines in step S1 that no error occurs in the CAN bus 121 or 122 (S1: NO), it determines whether the number of times of error occurrence in the CAN bus 121 or 122 is larger than 0 (step S11).

If the main controller 110A determines that the number of times of error occurrence in the CAN bus 121 or 122 is larger than 0 (S11: YES), the degree-of-occurrence measuring unit 114 decrements the count value with respect to the CAN bus (121 or 122) of which the number of times of error occurrence is larger than 0 (step S12).

The main controller 110A determines whether the number of times of error occurrence in the CAN bus 121 or 122 is equal to zero (step S13). Step S13 is provided for returning the value of the FDF to "1", if the number of times of error occurrence has returned to zero.

If the main controller 110A determines in step S13 that the number of times of error occurrence in the CAN bus 121 or 122 is equal to zero (S13: YES), the communication controller 115 sets the value of the data holding unit (115A-115D) holding "0", among the data holding units 115A-115D, to "1" (step S14). In the following steps, the value of the data holding unit (115A-115D) is held at "1", until it is set again to "0" in step S4 or step S9.

The main controller 110A proceeds to step S7 after executing step S14.

If it is determined that the number of times of error occurrence in the CAN bus 121 or 122 is not larger than 0 (S11: NO), the main controller 110A proceeds to step S7, since the number of times of error occurrence is equal to zero, and the value of the FDF may be held at "1".

If the communication controller 115 determines in step S8 that the number of times of error occurrence in the CAN bus 121 or 122 is equal to or larger than the predetermined number of times N2 (S8: NO), the main controller 110A proceeds to step S6. For example, when the number of times of error occurrence is equal to or larger than the predetermined number of times N1, and is smaller than the predetermined number of times N2, and the destination of data is the LKA-ECU 133 or the transmission ECU 136, the main controller 110A proceeds from step S8 to step S6.

If the communication controller 115 determines in step S10 that there is no data to be transmitted to the LKA-ECU 133 or the transmission ECU 136 (S10: NO), the main controller 110A proceeds to step S7. Since none of the ECUs 131-136 is the destination of data, the main controller 110A proceeds to step S7 without executing step S6 (data transmitting operation).

In the manner as described above, the CGW-ECU 110 executes the control routine shown in FIG. 7.

Figure 8:
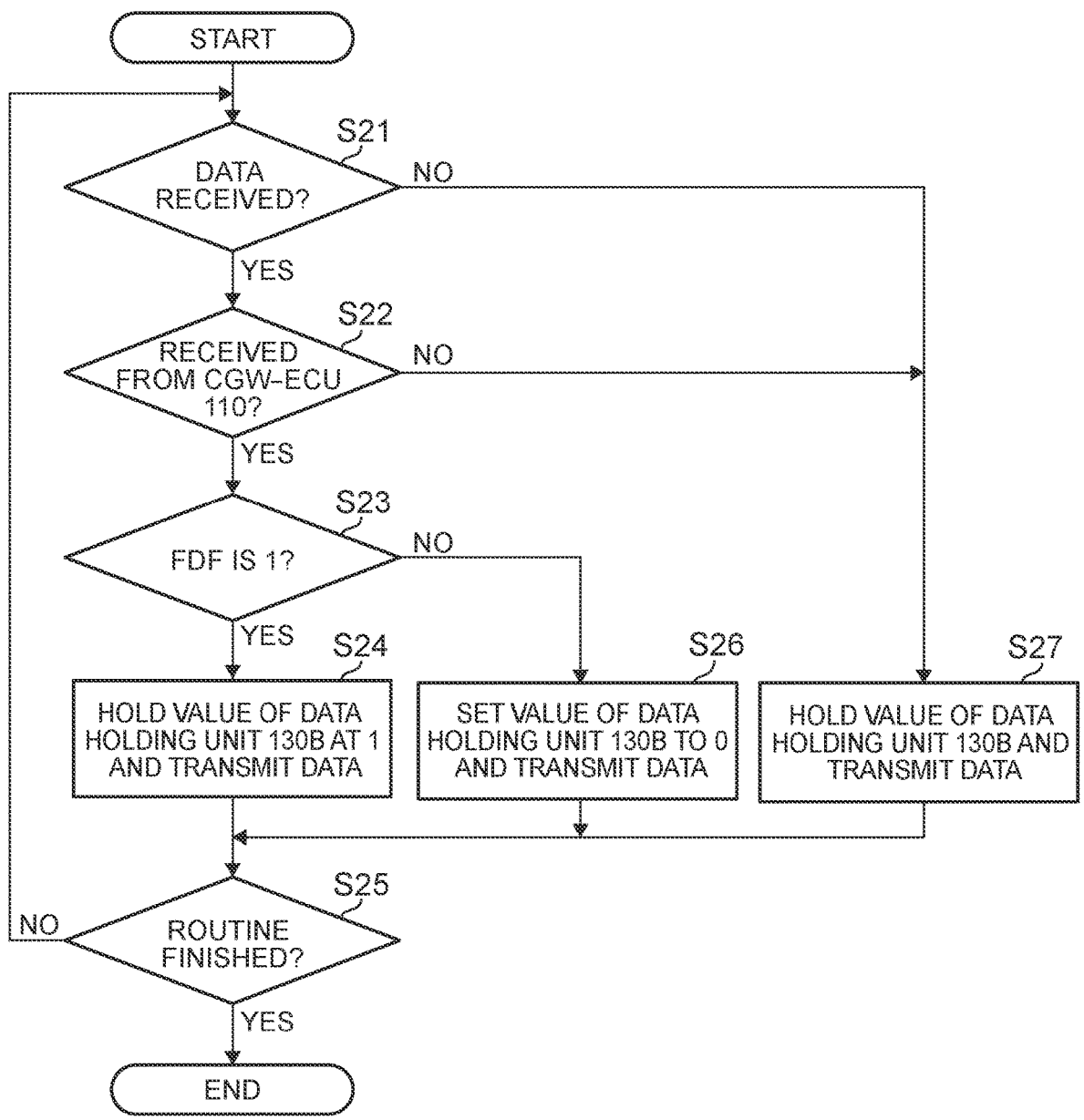
FIG. 8 is a flowchart illustrating a control routine executed by a communication controller of the ECU.

FIG. 8 is a flowchart illustrating a control routine executed by the communication controller 130A of each of the ECUs 131-136.

When the ignition switch of the vehicle is turned on, the communication controller 130A starts the control routine (START).

The communication controller 130A determines whether it has received data via the CAN bus 121 (step S21).

If the communication controller 130A determines that it has received data (S21: YES), it determines whether it received the data from the CGW-ECU 110 (step S22).

If the communication controller 130A determines that it received the data from the CGW-ECU 110 (S22: YES), it determines whether the value of the FDF is "1" (step S23). It is determined whether the data received was transmitted from the CGW-ECU 110, because the CGW-ECU 110 comprehensively performs switching of the communication speed and the communication data amount, and the ECUs 131-136 switch the communication speed and the communication data amount, depending on switching by the CGW-ECU 110. The determination of step S23 is made, so as to determine whether the higher communication speed and the larger communication data volume are to be maintained, when the ECU 131-136 transmits data.

If the communication controller 130A determines that the value of the FDF is "1" (S23: YES), it holds (keeps) the value stored in the data holding unit 130B at "1" or sets the value to "1". Also, if there is any data stacked in the buffer, the communication controller 130A transmits the oldest data in a condition where the value of the FDF is held at "1" (step S24). If there is no data stacked in the buffer, the data transmitting operation is not performed in step S24.

The value stored in the data holding unit 130B is held (kept) at "1" in step S24, when the value stored in the data holding unit 130B was "1" in the last control cycle. The value stored in the data holding unit 130B is set to "1" in step S24, when the value stored in the data holding unit 130B was "0" in the last control cycle.

The communication controller 130A determines whether the control routine of FIG. 8 is to be finished. The control routine is finished when the ignition switch of the vehicle is turned off. If the communication controller 130A determines that the control routine is to be finished (S25: YES), the series of steps in the routine stop being executed (END). If, on the other hand, the communication controller 130A determines that the control routine is not to be finished (S25: NO), the control returns to step S21.

If the communication controller 130A determines in step S23 that the value of the FDF is not "1" (S23: NO), it sets the value stored in the data holding unit 130B to "0". If there is any data stacked in the buffer, the communication controller 130A transmits the oldest data, in a condition where the value of the FDF is set to "0" (step S26). If there is no data stacked in the buffer, no data transmitting operation is performed. The communication controller 130A proceeds to step S25, after transmitting data.

If the communication controller 130A determines in step S22 that it does not receive data from the CGW-ECU 110 (S22: NO), it holds (keeps) the value stored in the data holding unit 130B at the same value. If there is any data stacked in the buffer, the communication controller 130A transmits the oldest data, in a condition where the value of the FDF is set to the value stored in the data holding unit 130B (step S27). If there is no data stacked in the buffer, no data transmitting operation is performed. Once the operation of step S27 is finished, the communication controller 130A proceeds to step S25.

If the communication controller 130A determines in step S21 that it has not received any data (S21: NO), it proceeds to step S27.

As described above, when the value of the FDF of the data received from the CGW-ECU 110 is "0", the communication controller 130A of the ECU 131-136 sets the value stored in the data holding unit 130B to "0", and sets the value of the FDF of data transmitted from itself (ECU 131-136) to "0". The value stored in the data holding unit 130B is changed to "0" in step S26, and is returned to "1" in step S24.

Figure 9:
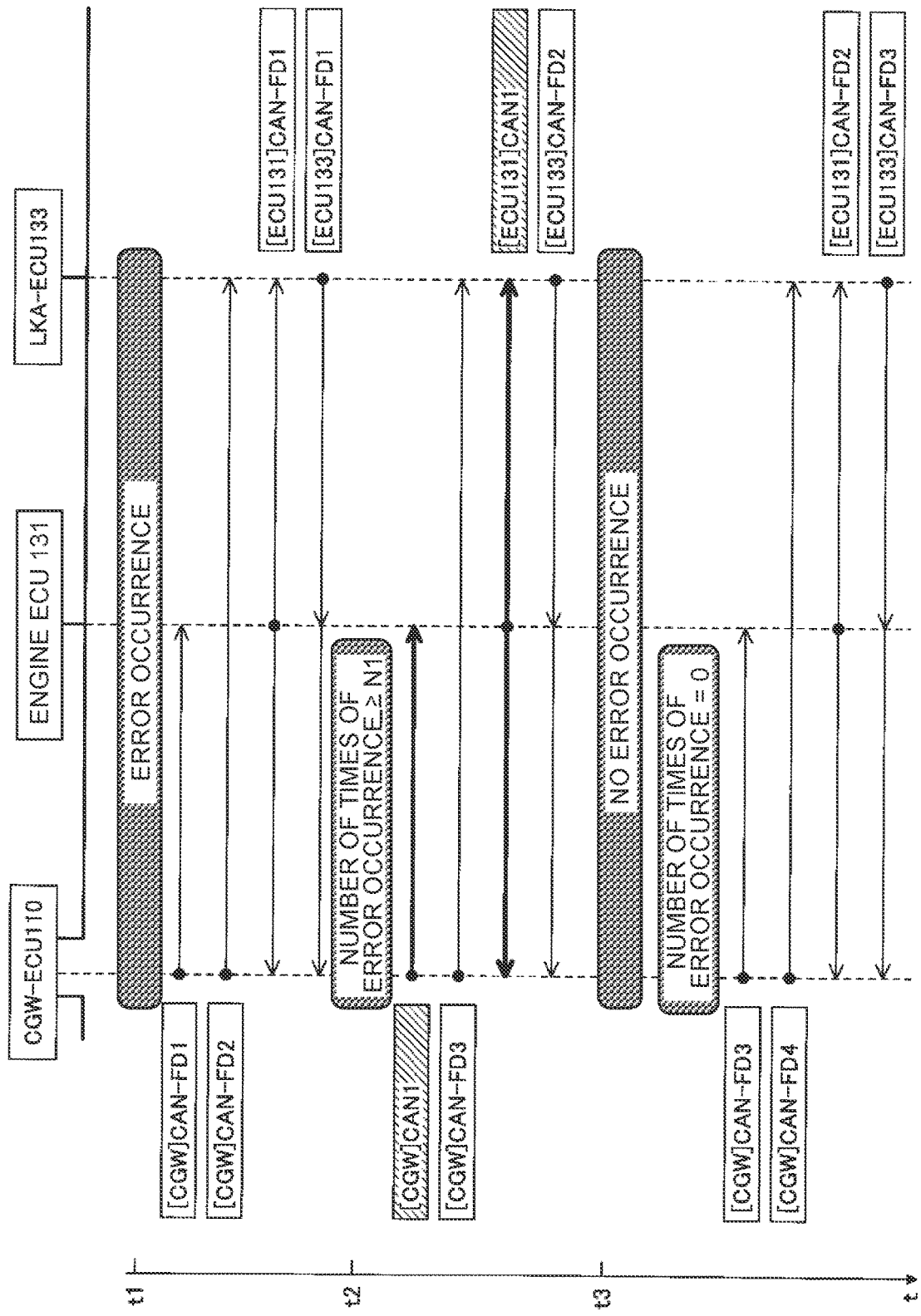
FIG. 9 is a vie showing one example of operation of the CGW-ECU.

FIG. 9 is a view showing one example of operation of the CGW-ECU 110. FIG. 9 shows flow of data among the CGW-ECU 110, engine ECU 131, and the LKA-ECU 133. In FIG. 9, the time axis t is taken in the vertical direction, and flow of data among the CGW-ECU 110, engine ECU 131, and the LKA-ECU 133 is indicated in the lateral direction.

If an error occurs in the CAN bus 121 at time t1, the CGW-ECU 110 detects the error, and increments the number of times of error occurrence. At this point in time, the number of times of error occurrence in the CAN bus 121 is smaller than the predetermined number of times N1.

Therefore, after time t1 (until time t2 is reached), data [CGW]CAN-FD1 is transmitted from the CGW-ECU 110 to the engine ECU 131, and data [CGW]CAN-FD2 is transmitted from the CGW-ECU 110 to the LKA-ECU 133.

Also, data [ECU131]CAN-FD1 is transmitted from the engine ECU 131 to the CGW-ECU 110 and the LKA-ECU 133, and data [ECU133]CAN-FD1 is transmitted from the LKA-ECU 133 to the CGW-ECU 110 and the engine ECU 131.

The data volume of each of the data [CGW]CAN-FD1, data [CGW]CAN-FD2, data [ECU131]CAN-FD1, and data [ECU133]CAN-FD1 is 32 bytes, and the communication speed is 2 Mbps. Namely, these four data are data in the CAN-FD format, which are transmitted at the higher communication speed, in the larger communication data volume.

If the number of times of error occurrence in the CAN bus 121 reaches the predetermined number of times N1 at time t2, data [CGW]CAN1 is transmitted from the CGW-ECU 110 to the engine ECU 131. The data volume of data [CGW]CAN1 is 8 bytes, and the communication speed is 500 kbps. Namely, the data [CGW]CAN1 is data in the CAN frame format, which is transmitted at the lower communication speed, in the smaller communication data volume. Since the data [CGW]CAN1 is obtained by dividing 32-byte data in the CAN-FD frame format into four pieces of data, the four pieces of data [CGW]CAN1 are transmitted from the CGW-ECU 110 to the engine ECU 131.

Then, data [CGW]CAN-FD3 is transmitted from the CGW-ECU 110 to the LKA-ECU 133. The data volume of the data [CGW]CAN-FD3 is 32 bytes, and the communication speed is 2 Mbps. Namely, the data [CGW]CAN-FD3 is data in the CAN-FD frame format.

Then, the engine ECU 131 transmits data [ECU131] CAN1 to the CGW-ECU 110 and the LKA-ECU 133, and the LKA-ECU 133 transmits data [ECU133]CAN-FD2 to the CGW-ECU 110 and the engine ECU 131.

The data volume of data [ECU131]CAN1 is 8 bytes, and the communication speed is 500 kbps. Since the engine ECU 131 received the data [CGW]CAN1 in the CAN frame format, which was transmitted at the lower communication speed in the smaller communication data volume, from the CGW-ECU 110, the communication controller 130A of the engine ECU 131 refers to the value of the FDF of the data [CGW]CAN1, and reduces the communication speed and the communication data amount. Therefore, the communication controller 130A transmits data [ECU131]CAN1 at the lower communication speed, in the smaller communication data volume. Thus, the communication speed and communication data amount of at least one (engine ECU 131) of the plurality of first controllers (engine ECU131, PCS-ECU 132) connected to the CAN bus 121 are reduced. Since the data [ECU131]CAN1 is obtained by dividing 32-byte data into four pieces of data, the four pieces of data [ECU131] CAN1 are transmitted from the engine ECU 131.

On the other hand, the data volume of the data [ECU133] CAN-FD2 is 32 bytes, and the communication speed is 2 Mbps. The LKA-ECU 133 will output data at the lower communication speed, in the smaller communication data volume, if the number of times of error occurrence in the CAN bus 121 becomes equal to or larger than the predetermined number of times N2. However, at this point in time, the number of times of error occurrence in the CAN bus 121 has just reached the predetermined number of times N1, and N2 is larger than N1; therefore, the LKA-ECU 133 outputs data [ECU133]CAN-FD2, without reducing the communication speed and the communication data amount.

If the number of times of error occurrence in the CAN bus 121 returns to 0 at time T3, data [CGW]CAN-FD3 is transmitted from the CGW-ECU 110 to the engine ECU 131. The data volume of the data [CGW]CAN-FD3 is 32 bytes, and the communication speed is 2 Mbps.

Since the number of times of error occurrence has returned to zero, data [CGW]CAN-FD3 transmitted to the engine ECU 131 is switched to the CAN-FD frame with the higher communication speed and the larger communication data volume.

Also, data [CGW]CAN-FD4 is transmitted from the CGW-ECU 110 to the LKA-ECU 133. The data volume of the data [CGW]CAN-FD4 is 32 bytes, and the communication speed is 2 Mbps.

Also, data [ECU131]CAN-FD2 is transmitted from the engine ECU 131 to the CGW-ECU 110 and the LKA-ECU 133, and data [ECU133]CAN-FD3 is transmitted from the LKA-ECU 133 to the CGW-ECU 110 and the engine ECU 131.

The communication controller 130A of the engine ECU 131 switches data transmitted from the engine ECU 131, to data [ECU131]CAN-FD2 with the higher communication speed and the larger communication data volume. Also, data [ECU133]CAN-FD3 is transmitted at the higher communication speed, in the larger communication data volume.

In the manner as described above, switching of the communication speed and the communication data amount is performed.

According to the above embodiment, if the number of times of error occurrence becomes equal to or larger than the predetermined number of times N1, the communication speed and communication data amount of the engine ECU 131 and the PCS-ECU 132 are reduced with regard to the CAN bus 121, and the communication speed and communication data amount of the brake ECU 134 and the steering ECU 135 are reduced with regard to the CAN bus 121.

When the communication speed and the communication data amount are reduced, the communication time of data after the communication speed and communication data amount are reduced is made equal to or shorter than the communication time of data before the communication speed and the communication data amount are reduced.

Therefore, when an error occurs the predetermined number of times N1 or more in the CAN bus 121 or 122, data which the CGW-ECU 110 outputs to the CAN bus 121 or 122, and data which the ECU (one of the ECUs 131, 132, 134, 135) that received the above data outputs to the CAN bus 121 or 122 at the lower communication speed are less likely or unlikely to cause a communication delay or a communication failure in other ECUs (the remaining ones of the ECUs 131, 132, 134, 135).

Accordingly, the on-board network system 100 that is less likely or unlikely to suffer from a communication failure or a delay in data transmission, and the communication control method used in the on-board network system can be provided.

Since the CGW-ECU 110 comprehensively performs switching of the communication speed and the communication data amount, and the ECUs 131-136 switch the communication speed and the communication data amount, depending on switching by the CGW-ECU 110, the timing of switching can be unified. For example, if each ECU connected to the CAN 120 switches the communication speed and the communication data amount, the timing varies, and a communication failure or a delay in data transmission may occur. However, in this embodiment, the CGW-ECU 110 comprehensively performs switching of the communication speed and the communication data amount; therefore, it is possible to curb the communication failure and the delay in data transmission, from this point of view.

Generally, the possibility of collision between data increases as the communication speed is higher. In this embodiment, communications are performed at a high speed when no error occurs, and the communication speed is reduced according to the number of times of error occurrence; therefore, high-speed data communications that are less likely or unlikely to suffer from a communication failure or a delay in data transmission can be performed in the CAN 120.

In the illustrated embodiment, the CGW-ECU 110 has the error detecting units 111, 112, 113, degree-of-occurrence measuring unit 114, and the communication controller 115. However, any one or more of the error detecting units 111, 112, 113, degree-of-occurrence measuring unit 114, and the communication controller 115, or all of the error detecting units 111, 112, 113, degree-of-occurrence measuring unit 114, and the communication controller 115 may be provide outside the CGW-ECU 110, and may be configured to perform error detection, counting of the number of times of error occurrence, and communication control, in the CAN buses 121 and 122.

In the illustrated embodiment, the on-board network system 100 includes the CAN 120 constructed by the CAN buses 121, 122, 123. However, the CAN 120 may be constructed by a single CAN bus. In this case, a single error detecting unit suffices, and the single error detecting unit, degree-of-occurrence measuring unit 114, and the communication controller 115 may be configured to perform error detection in the single bus, counting of the number of times of error occurrence, and communication control, respectively.

In the illustrated embodiment, if no error is detected (the error flag is set to "0") by the error detecting unit 111 when the number of times of error occurrence is equal to one or more, the degree-of-occurrence measuring unit 114 decrements the count value. Namely, when normal data communications are performed without generating any error in the CAN bus 121 or 122, "1" is subtracted from the count value of the degree-of-occurrence measuring unit 114.

Figure 10A:
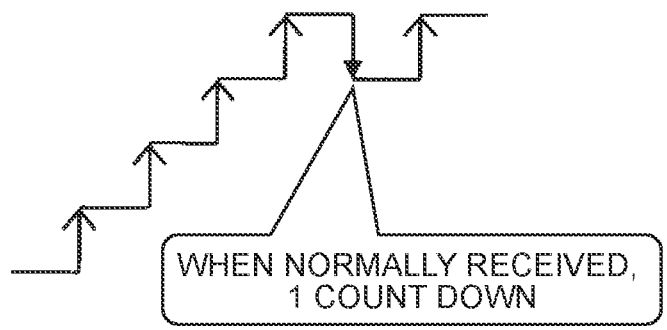
FIG. 10A is a view showing a method of reducing a count value of the number of times of error occurrence.
Figure 10B:
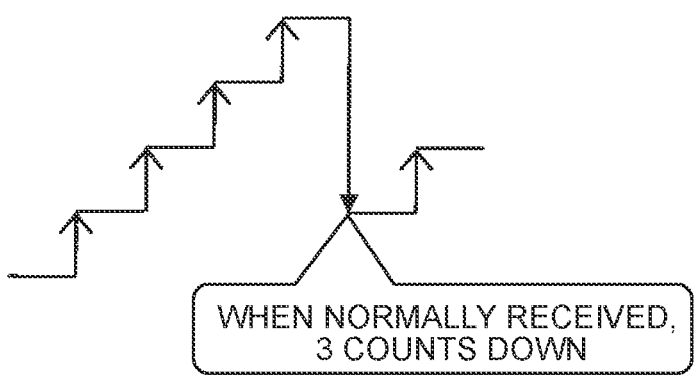
FIG. 10B is a view showing a method of reducing the count value of the number of times of error occurrence.
Figure 10C:
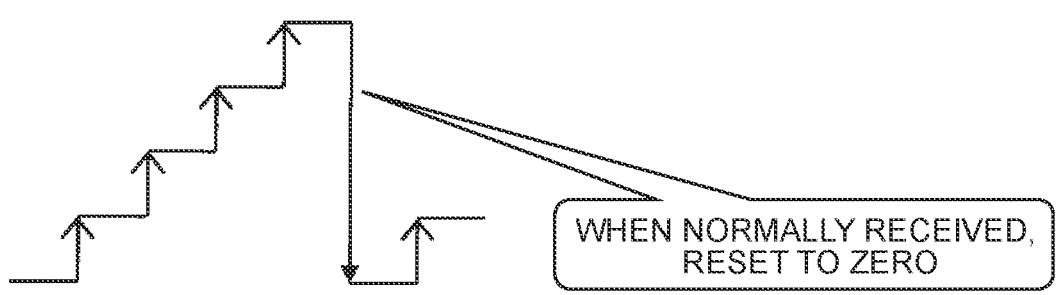
FIG. 10C is a view showing a method of reducing the count value of the number of times of error occurrence.

However, there are various methods of reducing the count value. FIG. 10A-FIG. 10C show the methods of reducing the count value of the number of times of error occurrence.

FIG. 10A shows a method of decrementing the count value (subtracting "1" from the count value at a time). This method has been described above.

FIG. 10B shows a method of reducing the count value by "3" at a time. When the count value has not reached 3 (the count value is 1 or 2), it may be made equal to 0 by subtracting 3 therefrom.

FIG. 10C shows a method of reducing the count value down to zero at a time. These methods may be used.

In the illustrated embodiment, the degree-of-occurrence measuring unit 114 counts the number of times detected by the error detecting units 111 and 112 as the degree of occurrence of errors. However, the degree-of-occurrence measuring unit 114 may measure a length of time (period) for which an error is detected by the error detecting units 111 and 112, as the degree of occurrence of errors.

For example, the degree-of-occurrence measuring unit 114 may measure the time for which an error is detected, by counting the number of control cycles in which the error flag is set to "1", and multiplying the count value by the control period (e.g., 10 ms (milliseconds)).

In the illustrated embodiment, when the number of times of error occurrence is equal to or larger than the predetermined number of times N1 and smaller than N2, the communication speed and communication data amount of the engine ECU 131, PCS-ECU 132, brake ECU 134, and the steering ECU 135 are reduced. When the number of times of error occurrence is equal to or larger than the predetermined number of times N2, the communication speed and communication data amount of the LKA-ECU 133 and the transmission ECU 136 are reduced.

However, since the combinations of the predetermined numbers of times N1, N2 and the ECUs 131-136 are optional, the combination of the predetermined number of times and the ECUs may be set as appropriate, according to the types, etc., of the ECUs included in the on-board network system 100.

In the illustrated embodiment, the ECUs 131-136 are divided into two groups based on the predetermined numbers of times N1 and N2, and the communication speed and the communication data amount are switched in two stages. However, the number of groups may be further increased, by using a predetermined number(s) of times other than the predetermined numbers of times N1 and N2.

In the illustrated embodiment, when the communication speed and communication data amount are reduced, the communication time of data after the communication speed and communication data amount are reduced becomes equal to or shorter than the communication time of data before the communication speed and communication data amount are reduced.

However, when the communication speed and communication data amount are reduced, a part of information included in the data may be further deleted. For example, the communication time of data may be further shortened, by deleting error-correction codes, such as MAC, checksum, and CRC, in the data field, from the CAN-FD frame.

In the above embodiment, when the number of times of error occurrence becomes equal to zero, the communication speed and the communication data amount are returned to those before reduction thereof. Therefore, even if the communication speed and the communication data amount are returned to the higher communication speed and the larger communication data volume, a communication failure or a delay in data transmission are far less likely or unlikely to occur.

Accordingly, the on-board network system 100 that can perform communications again at the higher communication speed, in the larger communication data volume, after the number of times of error occurrence becomes equal to zero, can be provided.

While the on-board network system of the exemplary embodiment of the disclosure, and the communication control method used in the on-board network system have been described above, this disclosure is not limited to the specifically disclosed embodiment, but may be subjected to various modifications or changes, without departing from the appended claims.

What is claimed is:

1. An on-board network system comprising:
   a control area network (CAN) that uses a first data frame (CAN-FD) and a second data frame (CAN frame), the CAN having a first bus and a second bus;
   a plurality of first controllers connected to the first bus;
   a plurality of second controllers connected to the second bus; and
   a relay device configured to relay data from the first bus to the second bus or from the second bus to the first bus, the relay device including a central gateway electronic control unit (CGW-ECU), the CGW-ECU having a computer including a processor for executing programs stored in memory thereof, the relay device configured to:
   detect an error that occurs in the first bus,
   measure a degree of error occurrence detected by the error detecting unit, and
   reduce a communication speed and a communication data amount of at least one of the plurality of first controllers from a first communication speed and a first communication data amount to a second communication speed and a second communication data amount, when the degree of error occurrence becomes equal to or larger than a first degree such that a first communication time it takes for data to be transmitted at the first communication speed in the first communication data amount is longer than a second communication time it takes for data to be transmitted at the second communication speed in the second communication data amount,
   wherein the CAN-FD is used for data communication at the first communication speed and the first data communication amount,
   wherein the CAN frame is used for data communication at the second communication speed and the second data communication amount, and
   wherein the CGW-ECU is configured to switch between the CAN-FC and CAN frame by changing a flexible data format value of the CAN-FD and CAN frame.

2. The on-board network system according to claim 1, wherein the CGW-ECU further configured to transmit first data at the second communication speed in the second communication data amount, to said at least one of the plurality of first controllers; and the first controller that has received the first data outputs second data to the first bus at the second communication speed in the second communication data amount.

3. The on-board network system according to claim 1,
wherein the CGW-ECU further configured to reduce the degree of error occurrence in the first bus, according to a degree by which the error is not detected in the first bus; and
wherein the CGW-ECU further configured to return the communication speed and the communication data amount of the first controller of which the communication speed and communication data amount have been reduced to the second communication speed and the second communication data amount, to the first communication speed and the first communication data amount, when the degree of error occurrence in the first bus becomes equal to zero.

4. The on-board network system according to claim 3, wherein the CGW-ECU further configured to transmit third data at the first communication speed in the first communication data amount, to the first controller of which the communication speed and the communication data amount have been reduced to the second communication speed and the second communication data amount, and the first controller that has received the third data outputs fourth data to the first bus at the first communication speed in the first communication data amount.

5. The on-board network system according to claim 1, wherein
when the degree of error occurrence in the first bus becomes equal to or larger than a second degree that is larger than the first degree, the CGW-ECU further configured to reduce the communication speed and the communication data amount of the second controller, from the first communication speed and the first communication data amount to the second communication speed and the second communication data amount, such that the first communication time is longer than the second communication time.

6. The on-board network system according to claim 5, wherein
when the degree of error occurrence in the first bus becomes equal to or larger than the second degree, the CGW-ECU further configured to transmit fifth data to the second controller at the second communication speed in the second communication data amount, and the second controller that has received the fifth data outputs sixth data to the first bus at the second communication speed in the second communication data amount.

7. The on-board network system according to claim 5, the CGW-ECU further configured to reduce the degree of error occurrence in the first bus, according to a degree by which the error is not detected in the first bus, and the CGW-ECU further configured to return the communication speed and the communication data amount of the second controller from the second communication speed and the second communication data amount to the first communication speed and the first communication data amount, when the degree of error occurrence in the first bus becomes equal to zero.

8. The on-board network system according to claim 7, wherein
when the degree of error occurrence in the first bus becomes equal to zero, the CGW-ECU further configured to transmit seventh data to the second controller at the first communication speed in the first communication data amount, and the second controller that has received the seventh data outputs eighth data to the first bus at the first communication speed in the first communication data amount.

9. The on-board network system according to claim 1, wherein
when the degree of error occurrence in the second bus becomes equal to or larger than a second degree that is larger than the first degree, the CGW-ECU further configured to reduce the communication speed and the communication data amount of the second controller from the first communication speed and the first communication data amount to the second communication speed and the second communication data amount, such that the first communication time is longer than the second communication time.

10. The on-board network system according to claim 9, wherein
when the degree of error occurrence in the second bus becomes equal to or larger than the second degree, the CGW-ECU further configured to transmit fifth data to the second controller at the second communication speed in the second communication data amount, and the second controller that has received the fifth data outputs sixth data to the second bus at the second communication speed in the second communication data amount.

11. The on-board network system according to claim 9, wherein the CGW-ECU further configured to reduce the degree of error occurrence in the second bus, according to a degree by which the error is not detected in the second bus; and
when the degree of error occurrence in the second bus becomes equal to zero, the communication controller returns the CGW-ECU further configured to the communication speed and the communication data amount of the second controller, from the second communication speed and the second communication data amount to the first communication speed and the first communication data amount.

12. The on-board network system according to claim 11, wherein
when the degree of error occurrence in the second bus becomes equal to zero, the CGW-ECU further configured to transmit seventh data to the second controller at the first communication speed in the first communication data amount, and the second controller that has received the seventh data outputs eighth data to the second bus at the first communication speed in the first communication data amount.

13. The on-board network system according to claim 9, wherein the relay device being configured to connect the first bus and the second bus in parallel with each other.

14. The on-board network system according to claim 1, wherein the CGW-ECU further configured to reduce the first communication data amount from approximately 32 bytes to the second communication data amount of approximately 8 bytes.

15. The on-board network system according to claim 1, wherein the CGW-ECU further configured to reduce the first communication speed from approximately 2 Mbps to the second communication speed of approximately 500 kbps.

16. A communication control method of controlling communications in an on-board network system including a control area network (CAN) that uses a first data frame (CAN-FD) and a second data frame (CAN-frame), the CAN having a first and a second bus, a plurality of first controllers connected to the first bus, a plurality of second controllers connected to the second bus, and a relay device configured to relay data from the first bus to the second bus or from the second bus to the first bus, the relay device including a central gateway electronic control unit (CGW-ECU), the CGW-ECU having a computer including a processor for executing programs stored in memory thereof, the method comprising the steps of:

detecting an error that occurs in the first bus;

measuring a degree of error occurrence detected; and reducing a communication speed and a communication data amount of at least one of the plurality of first controllers, from a first communication speed and a first communication data amount to a second communication speed and a second communication data amount, when the degree of error occurrence becomes equal to or larger than a first degree, wherein a first communication time it takes for data to be transmitted at the first communication speed in the first communication data amount is longer than a second communication time it takes for data to be transmitted at the second communication speed in the second communication data amount, wherein the CAN-FD is used for data communication at the first communication speed and the first data communication amount, wherein the CAN frame is used for data communication at the second communication speed and the second data communication amount, and wherein the CGW-ECU is configured to switch between the CAN-FC and CAN frame by changing a flexible data format value of the CAN-FD and CAN frame.

* * * * *